United States Patent
Kawabuchi et al.

(10) Patent No.: US 10,957,922 B2
(45) Date of Patent: Mar. 23, 2021

(54) CONTROL METHOD FOR FUEL CELL SYSTEM, AND FUEL CELL SYSTEM

(71) Applicant: NISSAN MOTOR CO., LTD., Yokohama (JP)

(72) Inventors: Mari Kawabuchi, Kanagawa (JP); Dong Song, Kanagawa (JP); Yosuke Fukuyama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/475,446

(22) PCT Filed: Jan. 10, 2017

(86) PCT No.: PCT/JP2017/000483
§ 371 (c)(1),
(2) Date: Jul. 2, 2019

(87) PCT Pub. No.: WO2018/131071
PCT Pub. Date: Jul. 19, 2018

(65) Prior Publication Data
US 2019/0341638 A1 Nov. 7, 2019

(51) Int. Cl.
*H01M 8/04228* (2016.01)
*H01M 8/04303* (2016.01)
(Continued)

(52) U.S. Cl.
CPC ..... *H01M 8/04228* (2016.02); *H01M 8/0491* (2013.01); *H01M 8/04303* (2016.02); *H01M 8/04365* (2013.01)

(58) Field of Classification Search
CPC .................................................. H01M 8/04228
See application file for complete search history.

(56) References Cited

U.S. PATENT DOCUMENTS

| 2004/0126645 | A1 | 7/2004 | Horiuchi et al. |
| 2014/0113162 | A1* | 4/2014 | Hottinen ........... H01M 8/04223 429/9 |
| 2015/0244011 | A1* | 8/2015 | Sudhan S ......... H01M 8/04649 429/430 |

FOREIGN PATENT DOCUMENTS

| JP | 2004-119270 A | 4/2004 |
| JP | 2011-192419 A | 9/2011 |

(Continued)

OTHER PUBLICATIONS

Andre Leonide et al., SOFC Modeling and Parameter Identification by Means of Impedance Spectroscopy, ESC Transactions, vol. 19, No. 20, 2009, pp. 81-109.

*Primary Examiner* — Brian R Ohara
(74) *Attorney, Agent, or Firm* — Foley & Lardner LLP

(57) ABSTRACT

A control method for a fuel cell system that includes a solid oxide fuel cell configured to generate power upon receipt of supply of an anode gas and a cathode gas includes an anode protection execution determination process of performing execution determination of an anode protection process of applying a predetermined protection current to the fuel cell in order to restrain catalyst oxidation in an anode of the fuel cell. In the anode protection execution determination process, an internal impedance of the fuel cell at an anode response frequency at which an anode reaction resistance of the fuel cell is detectable is acquired, and based on the internal impedance at the anode response frequency, whether the anode protection process is to be executed or not is determined.

3 Claims, 11 Drawing Sheets

(51) Int. Cl.
*H01M 8/0432* (2016.01)
*H01M 8/04858* (2016.01)

(56) References Cited

FOREIGN PATENT DOCUMENTS

| | | |
|---|---|---|
| JP | 2014-523081 A | 9/2014 |
| JP | 2016-181375 A | 10/2016 |
| WO | WO-2013/001166 A1 | 1/2013 |

* cited by examiner

CONTROL METHOD FOR FUEL CELL SYSTEM, AND FUEL CELL SYSTEM

TECHNICAL FIELD

The present invention relates to a control method for a fuel cell system, and a fuel cell system.

BACKGROUND ART

In a fuel cell system including a solid oxide fuel cell, from the viewpoint of preventing oxidative degradation of an anode catalyst, a predetermined anode protection process is performed when the fuel cell is activated. As one example of the anode protection process, an EAP (Electric Anode Protection) process of applying a reverse current (a protection current) to a fuel cell stack at the time of system stop is proposed in JP 2014-523081 A.

Further, in a fuel cell system of JP 2014-523081 A, a stack temperature is estimated based on stack resistance information obtained by superimposing a high-frequency alternating current signal on a direct current signal of a fuel cell stack, and a setting current of the EAP process is adjusted based on the estimated stack temperature information.

SUMMARY OF INVENTION

However, though the EAP process is effective as a method for preventing oxidative degradation of the anode catalyst, the EAP process requires large power consumption.

Accordingly, an object of the present invention is to provide a control method for a fuel cell system, and a fuel cell system each of which can restrain oxidative degradation of an anode catalyst and restrain power consumption.

Means for Solving the Problem

According to an aspect of this invention, there is provided a control method for a fuel cell system that includes a solid oxide fuel cell configured to generate power upon receipt of supply of an anode gas and a cathode gas. The control method for the fuel cell system includes an anode protection execution determination process of performing execution determination of an anode protection process of applying a predetermined protection current to the fuel cell in order to restrain catalyst oxidation in an anode of the fuel cell. In the anode protection execution determination process, an internal impedance of the fuel cell at an anode response frequency at which an anode reaction resistance of the fuel cell is detectable is acquired, and based on the internal impedance at the anode response frequency, whether the anode protection process is to be executed or not is determined.

DESCRIPTION OF EMBODIMENTS

With reference to the drawings and so on, the following describes embodiments of the present invention. First described is a common system configuration in first to fifth embodiments described below.

System Configuration

Figure 1:
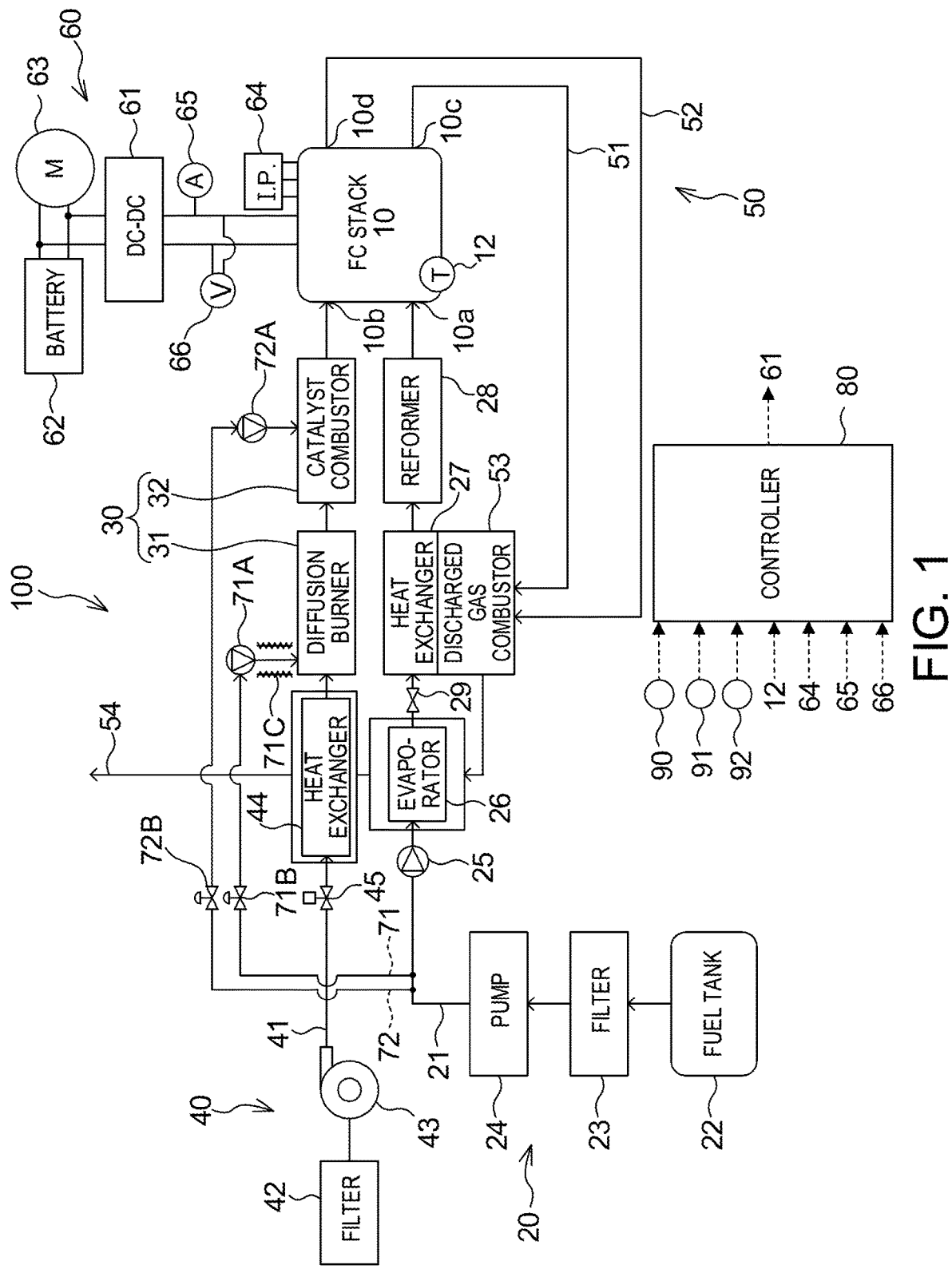
FIG. 1 is a schematic configuration diagram of a fuel cell system according to one embodiment.

FIG. 1 is a schematic configuration diagram of a fuel cell system 100 according to the present embodiment.

As illustrated in FIG. 1, the fuel cell system 100 is a solid oxide fuel cell system including a solid oxide fuel cell stack 10 configured to generate power upon receipt of supply of a fuel gas (hydrogen gas) as an anode gas and air as a cathode gas, and the fuel cell system 100 is provided in a vehicle or the like.

The fuel cell stack 10 is a laminated cell formed by laminating a plurality of solid oxide fuel cells (SOFC). Each of the solid oxide fuel cells (fuel cells) constituting the laminated cell is configured such that an electrolyte layer made of a solid oxide such as ceramic is sandwiched between an anode electrode to which the fuel gas containing hydrogen, hydrocarbon, and the like is supplied and a cathode electrode to which the air is supplied.

Further, inside the anode electrode of the fuel cell stack 10, an anode passage where the fuel gas supplied from an anode inlet 10a passes and an anode discharged gas after use is discharged from an anode outlet 10c is formed. Further, in the cathode electrode of the fuel cell stack 10, a cathode passage where the air supplied from a cathode inlet 10b passes and a cathode offgas after use is discharged from a cathode outlet 10d is formed.

Further, the fuel cell stack 10 is provided with a stack temperature sensor 12 configured to detect a temperature (hereinafter also referred to as "stack temperature Ts") of the fuel cell stack 10. The stack temperature sensor 12 sends a signal of the detected stack temperature Ts to a controller 80.

Further, the fuel cell system 100 includes a fuel supply mechanism 20 configured to supply the fuel gas to the fuel cell stack 10, an activation combustion mechanism 30 configured to burn the fuel gas and the air, an air supply mechanism 40 configured to supply the air to the fuel cell stack 10, a discharged gas mechanism 50 configured to discharge an anode discharged gas and a cathode discharged gas that are discharged from the fuel cell stack 10, an electric power mechanism 60 configured to perform input and output of electric power with respect to the fuel cell stack 10, and the controller 80 configured to generally control the operation of the whole fuel cell system 100.

The fuel supply mechanism 20 includes a fuel supply passage 21, a fuel tank 22, a filter 23, a pump 24, an injector 25, an evaporator 26, a heat exchanger 27, a reformer 28, and a pressure control valve 29.

The fuel supply passage 21 is a passage that connects the fuel tank 22 to the anode inlet 10a of the fuel cell stack 10.

The fuel tank 22 is a container in which a liquid fuel for reforming is stored, the liquid fuel being obtained by mixing ethanol and water, for example.

The filter 23 is disposed in the fuel supply passage 21 between the fuel tank 22 and the pump 24. The filter 23 removes foreign matter and the like included in the fuel for reforming before the fuel is sucked by the pump 24.

The pump 24 is provided in the fuel supply passage 21 on the downstream side from the fuel tank 22. The pump 24 sucks up the fuel for reforming, stored in the fuel tank 22, and supplies the fuel to the injector 25 and so on. Note that the output control of the pump 24 can be executed by the controller 80.

The injector 25 is disposed in the fuel supply passage 21 between the pump 24 and the evaporator 26. The injector 25 supplies the fuel supplied from the pump 24 into the evaporator 26 by injection.

The evaporator 26 is provided in the fuel supply passage 21 on the downstream side from the injector 25. The evaporator 26 vaporizes the fuel supplied from the injector 25 and supplies it to the heat exchanger 27. The evaporator 26 vaporizes the fuel by use of heat of discharged gas discharged from a discharged gas combustor 53 described below.

The heat exchanger 27 is provided in the fuel supply passage 21 on the downstream side from the evaporator 26 so as to be disposed to be adjacent to the discharged gas combustor 53. The heat exchanger 27 further heats the fuel vaporized in the evaporator 26 by use of heat transmitted from the discharged gas combustor 53.

The pressure control valve 29 is provided in the fuel supply passage 21 between the evaporator 26 and the heat exchanger 27. The pressure control valve 29 adjusts a pressure of the vaporized fuel to be supplied to the heat exchanger 27. The opening degree of the pressure control valve 29 is controlled by the controller 80.

The reformer 28 is provided in the fuel supply passage 21 between the heat exchanger 27 and the fuel cell stack 10. The reformer 28 reforms the fuel from the heat exchanger 27 by use of a catalyst provided inside the reformer 28. The fuel from the heat exchanger 27 is reformed to a fuel gas including hydrogen, hydrocarbon, carbon monoxide, and so on by a catalytic reaction in the reformer 28. The fuel gas thus reformed is supplied to the anode passage via the anode inlet 10a of the fuel cell stack 10 while the fuel gas is maintained at a high temperature.

Note that the fuel supply passage 21 includes branch passages 71, 72 branching off from the fuel supply passage 21. The branch passage 71 branches off from the fuel supply passage 21 between the pump 24 and the injector 25 so as to be connected to an injector 71A configured to supply the fuel to a diffusion burner 31. An on-off valve 71B configured to open and close the branch passage 71 is provided in the branch passage 71. Further, an electric heater 71C serving as a heating device for vaporizing the liquid fuel is provided in the injector 71A.

The branch passage 72 branches off from the fuel supply passage 21 between the pump 24 and the injector 25 so as to be connected to an injector 72A configured to supply the fuel to a catalyst combustor 32. An on-off valve 72B configured to open and close the branch passage 72 is provided in the branch passage 72.

The on-off valves 71B, 72B are controlled to open and close by the controller 80 at the time when the fuel cell system 100 starts or stops, for example.

Next will be described the air supply mechanism 40 and the activation combustion mechanism 30.

The air supply mechanism 40 includes an air supply passage 41, a filter 42, an air blower 43, a heat exchanger 44, and a throttle 45. Further, the activation combustion mechanism 30 includes the diffusion burner 31 and the catalyst combustor 32.

The air supply passage 41 is a passage that connects the air blower 43 to the cathode inlet 10b of the fuel cell stack 10.

The air blower 43 takes an external air (air) in the air blower 43 via the filter 42 and supplies the air thus taken in the air blower 43 to the fuel cell stack 10 as a cathode gas. Note that the output of the air blower 43 can be controlled by the controller 80. Note that the filter 42 removes foreign matter included in the air before the air is taken in the air blower 43.

The heat exchanger 44 is provided in the air supply passage 41 on the downstream side from the air blower 43. The heat exchanger 44 is a device configured to heat the air by use of heat of the discharged gas discharged from the discharged gas combustor 53. The air heated by the heat exchanger 44 is supplied to the diffusion burner 31.

The throttle 45 is provided in the air supply passage 41 between the air blower 43 and the heat exchanger 44. The opening degree of the throttle 45 is adjusted by the controller 80 in accordance with an air flow rate or the like requested to the fuel cell stack 10, for example.

The diffusion burner 31 is disposed in the air supply passage 41 on the downstream side from the heat exchanger 44. The fuel gas vaporized in a warm-up operation at the time when the fuel cell system 100 is activated and the air from the air blower 43 are supplied to the diffusion burner 31. More specifically, the fuel injected via the injector 71A of the branch passage 71 is heated and vaporized by the electric heater 71C to turn into a fuel gas, and the fuel gas is supplied to the diffusion burner 31. In the meantime, the air heated from the air blower 43 is supplied to the diffusion burner 31 in a state where the air is heated by the heat exchanger 44. In the diffusion burner 31, a mixed gas of the fuel gas and the air thus supplied is ignited by an igniter (not shown) to burn. That is, the diffusion burner 31 functions as a preheating burner configured to supply a high-temperature combustion gas (a preheating combustion gas) to the catalyst combustor 32.

Note that, at the time of a normal operation and the like of the fuel cell system 100 except the activation of the fuel cell system 100, the supply of the fuel and the operation of the igniter are stopped, and the air supplied from the air blower 43 passes through the diffusion burner 31 so as to be supplied to the catalyst combustor 32.

The catalyst combustor 32 is provided in the air supply passage 41 between the diffusion burner 31 and the fuel cell stack 10. The catalyst combustor 32 is a device inside which a catalyst is provided and which is configured to generate a high-temperature combustion gas by use of the catalyst.

At the time of the activation of the fuel cell stack 10, for example, a gas (the air and the preheating combustion gas) from the air supply passage 41 and the fuel injected via the injector 72A of the branch passage 72 are supplied to the catalyst combustor 32. The catalyst of the catalyst combustor 32 is heated by the preheating combustion gas, and the air and the fuel burn on the catalyst thus heated, so that the combustion gas is produced.

The combustion gas is a high-temperature inert gas hardly including oxygen, and the combustion gas is supplied to the fuel cell stack 10 so as to heat the fuel cell stack 10 and so on. Hereby, the temperature of the fuel cell stack 10 can be raised to a desired operating temperature. Note that, in the normal operation except the warm-up operation, the supply of the fuel to the catalyst combustor 32 is stopped. Accordingly, in this case, the air supplied from the air blower 43 passes through the catalyst combustor 32 so as to be supplied to the fuel cell stack 10.

Next will be described the discharged gas mechanism 50. The discharged gas mechanism 50 includes an anode discharged gas discharge passage 51, a cathode discharged gas discharge passage 52, the discharged gas combustor 53, a confluence discharge passage 54, and so on.

The anode discharged gas discharge passage 51 connects the anode outlet 10c in the fuel cell stack 10 to an anode-side inlet portion of the discharged gas combustor 53. The anode discharged gas discharge passage 51 is a passage through which an anode discharged gas including the fuel gas discharged from the fuel passage of the fuel cell stack 10 flows.

The cathode discharged gas discharge passage 52 connects the cathode outlet 10d in the fuel cell stack 10 to a cathode-side inlet portion of the discharged gas combustor 53. The cathode discharged gas discharge passage 52 is a passage through which a cathode discharged gas discharged from the cathode passage in the fuel cell stack 10 flows.

In the discharged gas combustor 53, the anode discharged gas from the anode discharged gas discharge passage 51 and the cathode discharged gas from the cathode discharged gas discharge passage 52 join each other and are burnt by a catalyst, so that a discharged gas mainly made of carbon dioxide and water is generated.

Since the discharged gas combustor 53 is disposed to be adjacent to the heat exchanger 27, heat due to the catalytic combustion in the discharged gas combustor 53 is transmitted to the heat exchanger 27. The heat thus transmitted to the heat exchanger 27 is used to heat the fuel supplied to the reformer 28.

The confluence discharge passage 54 is connected to a gas outlet portion (a downstream end) of the discharged gas combustor 53. The discharged gas discharged from the discharged gas combustor 53 is discharged to the outside of the fuel cell system 100 via the confluence discharge passage 54. The confluence discharge passage 54 is configured to pass through the evaporator 26 and the heat exchanger 44, so that the evaporator 26 and the heat exchanger 44 are heated by the discharged gas passing through the confluence discharge passage 54.

Next will be described the electric power mechanism 60. The electric power mechanism 60 includes a DCDC converter 61 functioning as a protection current applying device, a battery 62, a drive motor 63, an impedance measuring device 64, a current sensor 65, and a voltage sensor 66.

The DCDC converter 61 is electrically connected to the fuel cell stack 10 and is configured to boost an output voltage of the fuel cell stack 10 and supply electric power to the battery 62 and the drive motor 63. The battery 62 is configured to be charged with the electric power supplied from the DCDC converter 61 and supply the electric power to the drive motor 63.

Further, in the present embodiment, in the scene where oxidative atmosphere can be generated in an anode at the time when the operation (power generation) of the fuel cell stack 10 is stopped, the DCDC converter 61 applies a reverse current (an EAP current) having a desired magnitude to the fuel cell stack 10 from the battery 62 based on a command from the controller 80, the reverse current being a current reverse to a current obtained by power generation.

The process of applying this protection current is an anode protection process (hereinafter also referred to as "EAP process") to be executed for the purpose of restraining oxidative degradation of the anode. That is, the DCDC converter 61 functions as a protection current applying device. Note that, in the present embodiment, the DCDC converter 61 is controlled by the controller 80.

The drive motor 63 is a three-phase alternating current motor and functions as a power source for the vehicle. The drive motor 63 is connected to the battery 62 and the DCDC converter 61 via an inverter (not shown). Further, the drive motor 63 generates regenerative power at the time of braking of the vehicle, and the regenerative power is used for charging of the battery 62, for example.

The impedance measuring device 64 is a device configured to measure an internal impedance Z of the fuel cell stack 10 based on an output voltage and an output current of the fuel cell stack 10. More specifically, the impedance measuring device 64 applies an alternating current signal with a predetermined frequency to the fuel cell stack 10 and calculates the internal impedance Z based on an alternating current signal (an alternating voltage and alternating current) included in the output of the fuel cell stack 10. Then, the impedance measuring device 64 outputs the measured internal impedance Z to the controller 80.

The current sensor 65 detects an output current of the fuel cell stack 10. The voltage sensor 66 detects an output voltage of the fuel cell stack 10, that is, a terminal-to-terminal voltage between an anode-electrode side terminal and a cathode-electrode side terminal.

The controller 80 configured to generally control the operation of the whole system is constituted by a microcomputer including a central processing unit (CPU), a read only memory (ROM), a random access memory (RAM), and an input-output interface (I/O interface). The controller 80 executes a process to control the fuel cell system 100 by executing a specific program.

Signals from external sensors configured to detect a vehicle state, such as an outside air temperature sensor 90 configured to detect an outside air temperature, an EV key switch operation signal detection sensor 91 configured to detect an operation signal of an EV key, and an acceleration stroke sensor 92 configured to detect a stepping amount of an accelerator pedal, are input into the controller 80, in addition to signals from various measuring devices and sensors such as the stack temperature sensor 12, the impedance measuring device 64, the current sensor 65, and the voltage sensor 66. The controller 80 controls the opening degrees of various valves and injectors and performs a control on each actuator for the DCDC converter 61 or the like based on these signals.

The controller 80 calculates a generation power target value for the fuel cell stack 10 based on detection values from various measuring devices and sensors and the operating state of the fuel cell stack 10 and controls actuators for various valves, injectors, and the like to adjust respective supply amounts of the fuel gas and the air to the fuel cell stack 10 so as to achieve the generation power target value.

Particularly, in the present embodiment, the controller 80 acquires, from the impedance measuring device 64, the internal impedance Z at an anode response frequency at which an anode reaction resistance of the fuel cell stack 10 is detectable.

Then, the controller 80 performs an anode protection execution determination process of determining whether an anode protection process of restraining oxidation of a catalyst in the anode is to be executed or not, based on the acquired internal impedance Z. The anode protection execution determination process will be described later more specifically.

Here, an underlying technology leading to the control method for the fuel cell system 100 according to the present embodiment will be described.

In the fuel cell 10, when the oxygen concentration in the anode rises in a state where a stack temperature Ts exceeds a predetermined oxidative degradation point (e.g., a predetermined temperature between 400° C. to 500° C.), a reaction (hereinafter also referred to as "anode catalyst oxidative reaction") in which nickel constituting the catalyst included in the anode is oxidized to produce nickel oxide occurs.

When the anode catalyst oxidative reaction progresses, irreversible degradation in which the catalytic particle structure of the anode changes and deteriorates occurs, and this affects the output performance of the fuel cell stack 10. Further, since the catalytic volume of the anode expands due to generation of nickel oxide, the expanded catalyst causes a crack in an electrolyte membrane, so that the output of the fuel cell stack 10 might decrease due to the irreversible degradation such as a decrease in electrolytic insulation or cross leakage.

Particularly, there is such a concern that the anode catalyst oxidative reaction might occur at the time of activation to start power generation of the fuel cell stack 10, at the time of operation stop to stop the power generation, or the like. For example, in an operation stop process to be performed at the time of the operation stop of the fuel cell stack 10, such a state is assumed that the stack temperature Ts is close to an operating temperature (e.g., 700° C. to 900° C.) that is suitable for power generation and exceeds the oxidative degradation point.

Meanwhile, during the operation stop process, the supply of the fuel gas to the anode of the fuel cell stack 10 is stopped, or at least the supply flow rate of the fuel gas decreases. Hereby, the pressure in the anode decreases and the external air (air) flows backward to the anode from the confluence discharge passage 54 via the anode discharged gas discharge passage 51, so that the oxygen concentration in the anode increases and the anode catalyst oxidative reaction is promoted.

Further, during the operation stop process, while the supply flow rate of the fuel gas to the anode decreases, the air supply to the cathode may be continued for the purpose of cooling or the like. In this case, though the pressure in the anode decreases, the pressure in the cathode does not largely decrease. Accordingly, a pressure difference between the anode and the cathode increases, so that so-called back diffusion in which the air diffuses from the cathode to the anode easily occurs. The back diffusion also causes an increase of the oxygen concentration in the anode, so that the anode catalyst oxidative reaction is promoted.

Accordingly, conventionally, the EAP process is performed at the time of operation stop so as to restrain the anode catalyst oxidative reaction. However, the EAP process consumes electric power, and therefore, it is desirable not to execute the EAP process as much as possible, or even if the EAP process is to be executed, it is desired that an EAP current be lowered.

Here, in the conventional fuel cell system disclosed in JP 2014-523081 A, for example, the stack temperature Ts is estimated based on stack resistance information (an internal impedance) obtained by superimposing a high-frequency alternating current signal on a direct current signal of a fuel cell stack, and an EAP current is adjusted based on the estimated stack temperature Ts.

Meanwhile, the internal impedance Z of the fuel cell stack 10 includes various elements (hereinafter referred to as "internal impedance elements") such as an anode reaction resistance and a diffusive resistance of the anode, a cathode reaction resistance and a diffusive resistance of the cathode, and information of a solid electrolyte, depending on the frequency (hereinafter also referred to as "measurement frequency") of the alternating current signal to be used for the measurement.

Each internal impedance element exhibits a different response (sensitiveness) for each measurement frequency. That is, the frequency that strongly affects the value of the internal impedance varies depending on an internal impedance element. More specifically, some types of the internal impedance elements are highly sensitive to high frequencies, while some types of the internal impedance elements are highly sensitive to low frequencies.

For example, an internal impedance element such as a state of a substrate of the anode or the cathode or a contact resistance between the anode or the cathode and the electrolyte largely affects an internal impedance within a high frequency band of several tens kHz or more. Meanwhile, the stack temperature Ts does not necessarily strictly correspond to an internal impedance element highly sensitive to the frequencies in the high frequency band.

Accordingly, even if the EAP current is adjusted by the stack temperature Ts estimated based on an internal impedance at a high frequency, it might be difficult to restrain the anode catalyst oxidative reaction appropriately, due to an insufficiency of the EAP current. Further, conversely, it is conceivable that, in order to restrain the anode catalyst oxidative reaction, the EAP current is set to be higher than an appropriate actual request, so that power consumption becomes excessive.

In this regard, the present embodiment solves the above problem in such a manner that an anode response frequency that is a frequency at which an anode reaction resistance is detectable is specified, and based on an internal impedance at this anode response frequency, the anode protection execution determination process of determining whether the EAP process is to be executed or not is performed. The following describes this more specifically.

Figure 2:
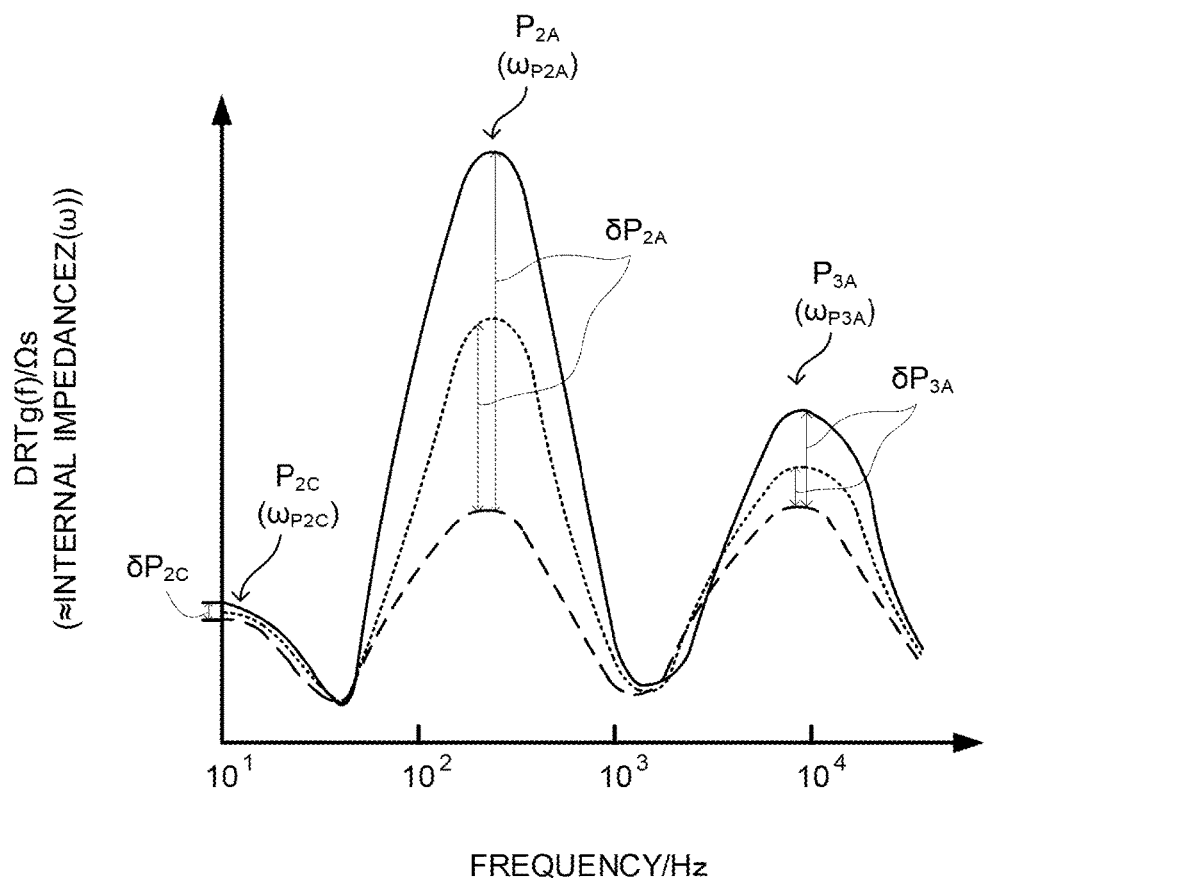
FIG. 2 is a view schematically illustrating a DRT spectrum of a fuel cell stack according to one embodiment.

FIG. 2 is a view schematically illustrating a DRT (Distribution of Relaxation Time) spectrum of the fuel cell stack 10 in a boundary frequency band including the anode response frequency. Particularly, FIG. 2 illustrates a DRT spectrum curve for each degree (a catalyst oxidation progress degree of the anode) of the oxidative atmosphere in the anode. More specifically, a spectrum curve C1 with a smallest anode oxidation degree is indicated by a broken line, a spectrum curve C2 with a second smallest anode oxidation degree is indicated by a dotted line, and a spectrum curve C3 with a largest anode oxidation degree is indicated by a continuous line.

Note that, in the following description, for simplification of the description, "frequency" and "angular frequency" are regarded as the same, and even in a case where "angular frequency" is meant strictly, this is referred to as "frequency."

The DRT spectrum of the fuel cell stack 10 is a spectrum of an internal impedance Z corresponding to a relaxation time (an inverse of a frequency) to be provided by executing DRT analysis (a relaxation time distribution method) on the fuel cell stack 10.

Details of the DRT analysis are disclosed in "SOFC Moderlling and Parameter Identification" (co-written by Andre Leonide, Yannick Apel, Ellen Ivers-Tiffee, The Electrochemical Society, May 1, 2009), and so on. Note that, in the following description, this literature is just referred to as "Non-patent Literature 1."

In the DRT analysis, a distribution of relaxation times (a distribution of frequencies) is calculated from internal-impedance measured values at a plurality of frequencies in a predetermined frequency range (e.g., 10 kHz to 0.1 Hz), and fitting is performed on the calculated values by a complex non-linear least squares method using a suitable equivalent circuit. Hereby, DRTg(f) can be calculated, and the DRT spectrum of the fuel cell stack 10 as illustrated in FIG. 2 is provided.

In the DRT spectrum provided by the DRT analysis, pieces of information of various internal impedance elements are exhibited in accordance with a difference in relaxation time, namely, a difference in response frequency. Particularly, in the DRT spectrum illustrated in FIG. 2, the anode reaction resistance and the cathode reaction resistance as main internal impedance elements are included in a frequency range of 10 Hz to 10 kHz.

More specifically, the DRT spectrum illustrated in FIG. 2 has a peak correlating with the cathode reaction resistance (hereinafter also referred to as "cathode reaction resistance peak $P_{2C}$"), a first peak correlating with the anode reaction resistance (hereinafter also referred to as "low-frequency side anode reaction resistance peak $P_{2A}$"), and a second peak correlating with the anode reaction resistance (hereinafter also referred to as "high-frequency side anode reaction resistance peak $P_{3A}$").

Further, in the example in the figure, a frequency $\omega_{P2C}$ of the cathode reaction resistance peak $P_{2C}$ is placed around 10 Hz, $\omega_{P2A}$ of the low-frequency side anode reaction resistance peak $P_{2A}$ is placed between 100 Hz to 1 kHz, and $\omega_{P3A}$ corresponding to the high-frequency side anode reaction resistance peak $P_{3A}$ is placed around 10 kHz.

Further, in FIG. 2, the low-frequency side anode reaction resistance peak $P_{2A}$ and the high-frequency side anode reaction resistance peak $P_{3A}$ change in accordance with the progress of catalyst oxidation in the anode. Here, the progress of catalyst oxidation in the anode in FIG. 2 is defined by the oxygen concentration or the like at the time when a predetermined amount of the air in accordance with the specification of the fuel cell stack 10 is supplied to the anode. That is, due to the air supply to the anode, hydrogen in the anode is discharged so that the hydrogen concentration in the anode decreases, and the oxygen concentration increases, thereby resulting in that the anode catalyst oxidative reaction progresses more.

Accordingly, the low-frequency side anode reaction resistance peak $P_{2A}$ and the high-frequency side anode reaction resistance peak $P_{3A}$ become higher as the catalyst oxidation in the anode largely progresses and the anode catalyst oxidative reaction progresses more. That is, the low-frequency side anode reaction resistance peak $P_{2A}$ and the high-frequency side anode reaction resistance peak $P_{3A}$ become higher in accordance with the progress of the catalyst oxidation in the anode. In contrast, the cathode reaction resistance peak $P_{2C}$ does not substantially correlate with the progress of the catalyst oxidation in the anode. That is, even if the catalyst oxidation in the anode progresses, a theoretical change of the cathode reaction resistance peak $P_{2C}$ is zero, except a change amount $\delta P_{2C}$ due to a tolerance or the like other than the catalyst oxidation in the anode.

The inventors focused attention on this phenomenon and focused attention on referring to the magnitude of an internal impedance at at least either the frequency $\omega_{P2A}$ of the low-frequency side anode reaction resistance peak $P_{2A}$ or the frequency $\omega_{P3A}$ of the high-frequency side anode reaction resistance peak $P_{3A}$, or at at least either a boundary frequency of the frequency $\omega_{P2A}$ or a boundary frequency of the frequency $\omega_{P3A}$. Then, the inventors found an idea that a progress degree of catalyst oxidation in the anode is diagnosed based on the magnitude of the internal impedance and execution determination of the EAP process in the fuel cell system 100 is performed.

Note that, in the present embodiment, the boundary frequency of the frequency $\omega_{P2A}$ indicates a given frequency in a frequency range in which the influence of the catalyst oxidation in the anode is detectable from the DRT spectrum. That is, the boundary frequency of the frequency $\omega_{P2A}$ is a frequency placed near the frequency $\omega_{P2A}$ and corresponding to an expansion width of the low-frequency side anode reaction resistance peak $P_{2A}$ and is a frequency at which an internal impedance Z can change to such an extent that the internal impedance Z is detectable though its change amount corresponding to a change of the catalyst oxidation in the anode is smaller than that of an internal impedance $Z(\omega_{P2A})$ at the frequency $\omega_{P2A}$. Further, the definition of the boundary frequency of the frequency $\omega_{P3A}$ is also similar to the boundary frequency of the frequency $\omega_{P2A}$.

In the following description, for simplification of the description, the frequency $\omega_{P2A}$ and its boundary frequencies are collectively referred to as "frequency $\omega_{P2A}$," and the frequency $\omega_{P3A}$ and its boundary frequencies are collectively referred to as "frequency $\omega_{P3A}$." That is, in the following description, each of the "frequency $\omega_{P2A}$" and the "frequency $\omega_{P3A}$" is not limited to its corresponding one frequency but shall be a concept that can include its boundary frequencies. That is, an anode response frequency of the present embodiment indicates either one of the frequency $\omega_{P2A}$ and its boundary frequencies and the frequency $\omega_{P3A}$ and its boundary frequencies or indicates both of them.

Further, DRTg($f_{P2A}$) ($\approx$ the internal impedance $Z(\omega_{P2A})$) at the frequency $\omega_{P2A}$ increases only by a change amount $\delta P_{2A}$ along with a change of the anode reaction resistance due to the catalyst oxidation in the anode. Also, DRTg($f_{P3A}$) ($\approx$ an internal impedance $Z(\omega_{P3A})$) at the frequency $\omega_{P3A}$ increases only by a change amount $\delta P_{3A}$ along with a change of the anode reaction resistance due to the catalyst oxidation in the anode.

Further, the internal impedance $Z(\omega_{P2A})$ and the internal impedance $Z(\omega_{P3A})$ hardly have a correlation with fluctuations of internal impedance elements such as the cathode reaction resistance except the anode reaction resistance. That is, $\delta P_{2A}$ of the internal impedance $Z(\omega_{P2A})$ and $\delta P_{3A}$ of the internal impedance $Z(\omega_{P3A})$ due to the change of the anode reaction resistance are very large in comparison with the internal impedance elements except the anode reaction resistance.

Accordingly, by referring to the magnitude of the internal impedance $Z(\omega_{P2A})$ or the internal impedance $Z(\omega_{P3A})$, it is possible to precisely diagnose the progress degree of the anode catalyst oxidative reaction and to appropriately perform execution determination of the EAP process in the fuel cell system 100.

Meanwhile, in the fuel cell stack 10, operating states such as an internal gas pressure and the stack temperature Ts variously change due to a request load and the like. Further, an electrochemical characteristic difference also occurs due to an individual difference in the fuel cell stack 10. Due to such a factor, it is assumed that the DRT spectrum changes variously.

As an example of the change, the low-frequency side anode reaction resistance peak $P_{2A}$ may shift to a low-frequency side or the width of the cathode reaction resistance peak $P_{2C}$ may expand. As a result, the low-frequency side anode reaction resistance peak $P_{2A}$ is mixed with the cathode reaction resistance peak $P_{2C}$. In this case, the internal impedance $Z(\omega_{P2A})$ at the frequency $\omega_{P2A}$ includes not only progress information of the oxidative reaction in the anode, but also information of the cathode reaction resistance having a low correlation with the oxidative reaction in the anode.

In consideration of such a circumstance, in the present embodiment, the high-frequency side anode reaction resistance peak $P_{3A}$ farther from the cathode reaction resistance peak $P_{2C}$ is used. That is, the execution determination of the EAP process is performed based on the internal impedance $Z(\omega_{P3A})$ at the frequency $\omega_{P3A}$. The following describes the procedure of an EAP execution determination process based on the internal impedance $Z(\omega_{P3A})$ at the frequency $(\omega_{P3A}$.

Figure 3:
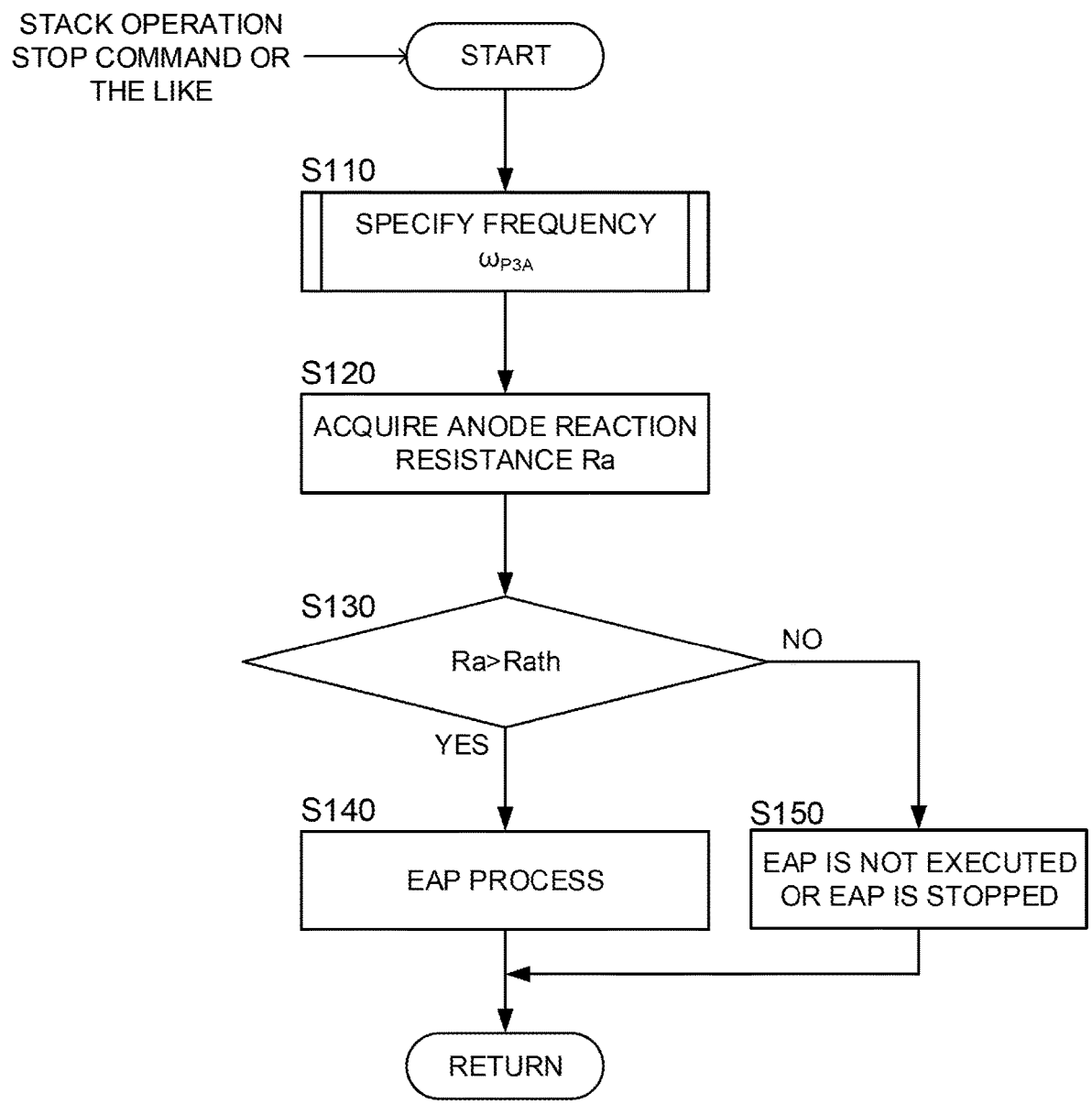
FIG. 3 is a flowchart illustrating the procedure of an EAP execution determination process according to one embodiment.

FIG. 3 is a flowchart illustrating the procedure of the EAP execution determination process in the present embodiment.

Here, the EAP execution determination process of the present embodiment is executed upon receipt of an EV-key OFF signal (a stop command of the operation of the fuel cell stack 10) as a trigger. That is, the EAP execution determination process is executed in the scene where, before a cooling process to be executed at the time of operation stop of the fuel cell stack 10, the anode may have an oxidative atmosphere though the stack temperature Ts is an oxidative degradation point or more. Note that the following routine is executed by the controller 80 repeatedly every predetermined period.

In step S110, a frequency $\omega_{P3A}$ corresponding to the high-frequency side anode reaction resistance peak $P_{3A}$ is specified by DRT analysis as an anode response frequency.

Figure 4:
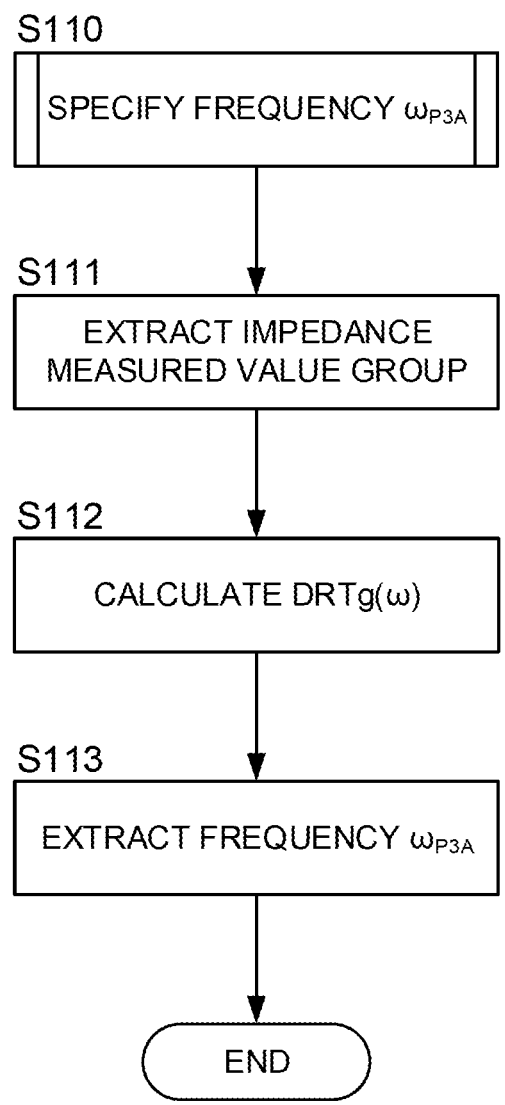
FIG. 4 is a flowchart to describe a specifying method of an anode response frequency according to one embodiment.

FIG. 4 is a flowchart illustrating the procedure to specify the frequency $\omega_{P3A}$ as the anode response frequency.

In step S111, the controller 80 extracts, from a memory or the like, internal-impedance measured values (hereinafter also referred to as "internal-impedance measured value group") at a plurality of frequencies belonging to a predetermined frequency band (e.g., 0.1 Hz to 100 kHz), from among measured values of the internal impedance Z measured by the impedance measuring device 64.

In step S112, the controller 80 calculates a distribution of relaxation times from the acquired internal-impedance measured value group and performs fitting on the calculated values by the complex non-linear least squares method by use of an appropriate equivalent circuit. Hereby, DRTg(f) is found. That is, a DRT spectrum indicated by DRTg(f) corresponds to a regression curve of the internal-impedance measured value group that models the equivalent circuit.

In step S113, the controller 80 extracts a frequency $\omega_{P3A}$ from the obtained DRT spectrum in accordance with a frequency extraction program set in advance. More specifically, the controller 80 first calculates a differential value of DRTg(f) within a range of a frequency band from 100 Hz to several tens kHz in which the high-frequency side anode reaction resistance peak $P_{3A}$ is highly likely to appear. The controller 80 then records frequencies $\omega_P$ at which the differential value of DRTg(f) is zero or not more than a predetermined value close to zero.

Further, in a case where the number of recorded frequencies $\omega_p$ is just one, the controller 80 extracts this as the frequency $\omega_{P3A}$. In the meantime, in a case where a plurality of frequencies $\omega_p$ is recorded, the controller 80 extracts a second smallest frequency $\omega_P$ as the frequency $\omega_{P3A}$ from among the frequencies $\omega_P$. Note that the reason why the second smallest frequency $\omega_P$ is taken as the frequency $\omega_{P3A}$ is as follows: in a case where a plurality of frequencies $\omega_P$ is recorded, a smallest frequency $\omega_P$ is highly likely to be the frequency $\omega_{P2A}$ corresponding to the low-frequency side anode reaction resistance peak $P_{2A}$, and meanwhile, third or later frequencies $\omega_P$ are likely to be internal impedance elements of other high frequency responses.

Thus, with the process described above, it is possible to specify the frequency $\omega_{P3A}$ corresponding to the high-frequency side anode reaction resistance peak $P_{3A}$.

Referring back to FIG. 3, in step S120, the controller 80 calculates an anode reaction resistance Ra($\omega_{P3A}$). More specifically, the controller 80 acquires an internal impedance $Z(\omega_{P3A})$ corresponding to the frequency $\omega_{P3A}$ extracted in step S110 from the internal-impedance measured value group. The controller 80 calculates an absolute value of the internal impedance $Z(\omega_{P3A})$ and acquires the anode reaction resistance Ra.

In step S130, the controller 80 determines whether or not the acquired anode reaction resistance Ra exceeds a predetermined threshold Rath stored in the memory or the like in advance. Here, the threshold Rath is determined from the viewpoint of whether or not the catalyst oxidation in the anode proceeds to such an extent that the execution of the EAP process is required.

For example, as has been described above, the anode reaction resistance Ra increases due to an increase of the oxygen concentration (a decrease of the hydrogen concentration) in the anode. However, in a case where the oxygen concentration does not so largely increase, such a case is assumed that the oxidative reaction that causes irreversible degradation of the catalyst does not proceed even without the execution of the EAP process.

Accordingly, in consideration of such a case where the EAP process does not need to be executed, a relationship between an increasing amount of the oxygen concentration that can adversely affect the catalyst of the anode and an increasing amount of the anode reaction resistance Ra corresponding to the increasing amount of the oxygen concentration is determined in advance by experiment or the like, and the threshold Rath is determined based on the increasing amount of the anode reaction resistance Ra.

When the controller 80 determines that the anode reaction resistance Ra exceeds the threshold Rath, the process proceeds to step S140. In step S140, in order to restrain the catalyst oxidation in the anode, the controller 80 sets a predetermined EAP current and executes the EAP process.

Meanwhile, when the controller 80 determines that the anode reaction resistance Ra is the threshold Rath or less, the process proceeds to step S150. In step S150, the controller 80 does not execute the EAP process, or when the EAP process has been already executed, the controller 80 stops the EAP process.

That is, in a case where the anode reaction resistance Ra is the threshold Rath or less, it is considered that the catalyst oxidation that causes irreversible degradation of the catalyst does not proceed even without the execution of the EAP process, and therefore, in this case, the execution of the EAP process is stopped, so that power consumption can be restrained.

The control method for the fuel cell system 100 according to the present embodiment yields the following effects.

In the present embodiment, the control method for the fuel cell system 100 including the fuel cell stack 10 as a solid oxide fuel cell configured to generate power upon receipt of supply of an anode gas (the fuel gas) and a cathode gas (the air) is provided.

The control method includes the EAP execution determination process as an anode protection execution determination process of performing execution determination of the EAP process as an anode protection process of applying a predetermined protection current to the fuel cell stack 10 in order to restrain catalyst oxidation in the anode of the fuel cell stack 10.

In the EAP execution determination process, the internal impedance $Z(\omega_{P3A})$ of the fuel cell stack 10 at the frequency $\omega_{P3A}$ as an anode response frequency at which the anode reaction resistance Ra of the fuel cell stack 10 is detectable is acquired (step S120 in FIG. 3), and it is determined whether the EAP process is to be executed or not, based on the internal impedance $Z(\omega_{P3A})$ thus acquired (step S130 in FIG. 3).

That is, the internal impedance $Z(\omega_{P3A})$ at the frequency $Z(\omega_{P3A})$ as the anode response frequency changes in accordance with the progress state of the catalyst oxidation, in the anode, that can cause irreversible degradation of the anode catalyst. Accordingly, by determining an execution timing of the EAP process based on the internal impedance $Z(\omega_{P3A})$, it is possible to precisely execute the EAP process in a necessary timing and to restrain an increase of power consumption caused due to unnecessary execution of the EAP process. In the meantime, the EAP process can be executed appropriately in a necessary situation, so that the oxidative degradation of the anode catalyst can be restrained.

Note that, in the control method for the fuel cell system 100 according to the present embodiment, the anode response frequency is the frequency $Z(\omega_{P3A})$ at which the change amount $Z(\omega_{P3A})$ of the internal impedance $Z(\omega_{P3A})$ (the change amount $\delta P_{3A}$ of DRTg(f) due to the change of the anode reaction resistance Ra is a predetermined value or more.

Hereby, the internal impedance $Z(\omega_{P3A})$ more strongly correlates to the progress state of the catalyst oxidation in the anode. Accordingly, it is possible to further improve the accuracy of the execution determination of the EAP process based on the internal impedance $Z(\omega_{P3A})$.

Note that, as the "predetermined value," various values are assumed depending on the configuration of the fuel cell stack 10 (the number of laminated fuel cells, an electrode material, and an individual difference). Particularly, it is preferable that the "predetermined value" be determined so that the change amount of the internal impedance $Z(\omega_{P3A})$ is detectable at a stage before the catalyst oxidation in the anode progresses to a given extent or more and irreversible degradation of the anode catalyst starts.

Particularly, the frequency $(\omega_{P3A}$ is a frequency at which the change amount $\delta P_{3A}$ of the internal impedance $Z(\omega_{P3A})$ due to the change of the anode reaction resistance Ra becomes larger than the change amount of the internal impedance $Z(\omega_{P3A})$ due to the change of an internal impedance element (the cathode reaction resistance or the like) except the anode reaction resistance Ra.

Hereby, the influence of the progress state of the catalyst oxidation in the anode is more strongly reflected on the internal impedance $Z(\omega_{P3A})$ than the influence due to the change of the internal impedance element other than this. Accordingly, it is possible to further improve the accuracy of the execution determination of the EAP process based on the internal impedance $Z(\omega_{P3A})$.

Further, the internal impedance element of the present embodiment includes the cathode reaction resistance that is a cathode reaction resistance of the fuel cell stack 10.

The anode response frequency includes, in DRTg(f) as spectrum data indicative of an internal impedance $Z(\omega)$, the frequency $\omega_{P3A}$ corresponding to the high-frequency side anode reaction resistance peak $P_{3A}$ that is one of the high-frequency side anode reaction resistance peak $P_{3A}$ and the low-frequency side anode reaction resistance peak $P_{2A}$ as two peaks correlating with the anode reaction resistance Ra. Note that, as described above, the term "frequency $(\omega_{P3A}$" in the present embodiment includes not only a given frequency $\omega_{P3A}$ strictly corresponding to the high-frequency side anode reaction resistance peak $P_{3A}$ but also boundary frequencies around the frequency $\omega_{P3A}$.

Hereby, the EAP execution determination process is performed based on the internal impedance $Z(\omega_{P3A})$ at the frequency $(\omega_{P3A}$ corresponding to the high-frequency side anode reaction resistance peak $P_{3A}$ farther from the cathode reaction resistance peak $P_{2C}$ corresponding to the cathode reaction resistance. That is, in the EAP execution determination process, the internal impedance $Z(\omega_{P3A})$ that hardly includes the influence of the cathode reaction resistance peak $P_{2C}$ and in which the progress of the catalyst oxidation in the anode is more dominant can be used. Accordingly, even in a case where the cathode reaction resistance peak $P_{2C}$ expands due to the operating state, the individual difference, or the like of the fuel cell stack 10, it is possible to highly precisely detect the catalyst oxidation in the anode, thereby making it possible to further improve the accuracy of the EAP execution determination process.

Further, in the control method for the fuel cell system 100 according to the present embodiment, an anode response frequency specifying process (see step S110 in FIG. 3) of specifying the frequency $(\omega_{P3A}$ is executed. More specifically, the controller 80 is programmed to perform a process of specifying an anode response frequency. That is, even in the fuel cell system 100 provided in the vehicle, it is possible to acquire the frequency $(\omega_{P3A}$ for the internal impedance $Z(\omega)$ suitable to perform the EAP execution determination process at a real time.

Further, in the present embodiment, when the anode reaction resistance Ra is higher than the predetermined threshold Rath, the EAP execution determination process is executed. Particularly, when the threshold Rath is set appropriately in accordance with an electrochemical characteristic difference due to an individual difference or the like in the fuel cell stack 10, it is possible to more appropriately perform the EAP execution determination process.

Further, in the present embodiment, the EAP execution determination process is executed at the time of operation stop of the fuel cell stack 10. More specifically, the controller 80 is programmed to perform the EAP execution determination process when the controller 80 receives an EV-key OFF signal that is a stop command of the operation of the fuel cell.

Hereby, it is possible to perform the EAP execution determination process particularly in the scene of the operation stop of the fuel cell stack 10 during which oxidative degradation of the anode catalyst is more likely to occur, thereby making it possible to more surely prevent the occurrence of irreversible oxidative degradation of the anode catalyst.

The fuel cell system 100 of the present embodiment includes: the fuel cell stack 10 as a solid oxide fuel cell configured to generate power upon receipt of supply of hydrogen gas and the air; the DCDC converter 61 as a protection current applying device configured to apply, to the fuel cell stack 10, a protection current for restraining catalyst oxidation in the anode of the fuel cell stack 10; the impedance measuring device 64 configured to measure the internal impedance $Z(\omega)$ of the fuel cell stack 10; and the controller 80 configured to control the DCDC converter 61 to execute the EAP process of applying the protection current, based on the internal impedance $Z(\omega)$ measured by the impedance measuring device 64.

The controller 80 is programmed to acquire the internal impedance $Z(\omega_{P3A})$ of the fuel cell stack 10 at the frequency ($\omega_{P3A}$ as the anode response frequency at which the anode reaction resistance Ra is detectable (step S120 in FIG. 3), and to execute the EAP execution determination process of determining whether or not the EAP process is to be executed or not, based on the internal impedance $Z(\omega_{P3A})$ at the frequency ($\omega_{P3A}$ (step S130 in FIG. 3).

Hereby, since it is possible to precisely execute the EAP process in a necessary timing, it is possible to restrain an increase of power consumption caused due to unnecessary execution of the EAP process and to restrain oxidative degradation of the anode catalyst by executing the EAP process appropriately in a necessary situation.

Second Embodiment

The following describes a second embodiment. Note that a component similar to a component in the first embodiment has the same reference sign as used in the first embodiment, and a description thereof is omitted. The present embodiment particularly describes an example in which the EAP execution determination process is performed based on the internal impedance $Z(\omega_{P2A})$ at the frequency $\omega_{P2A}$ corresponding to the low-frequency side anode reaction resistance peak $P_{2A}$.

Figure 5:
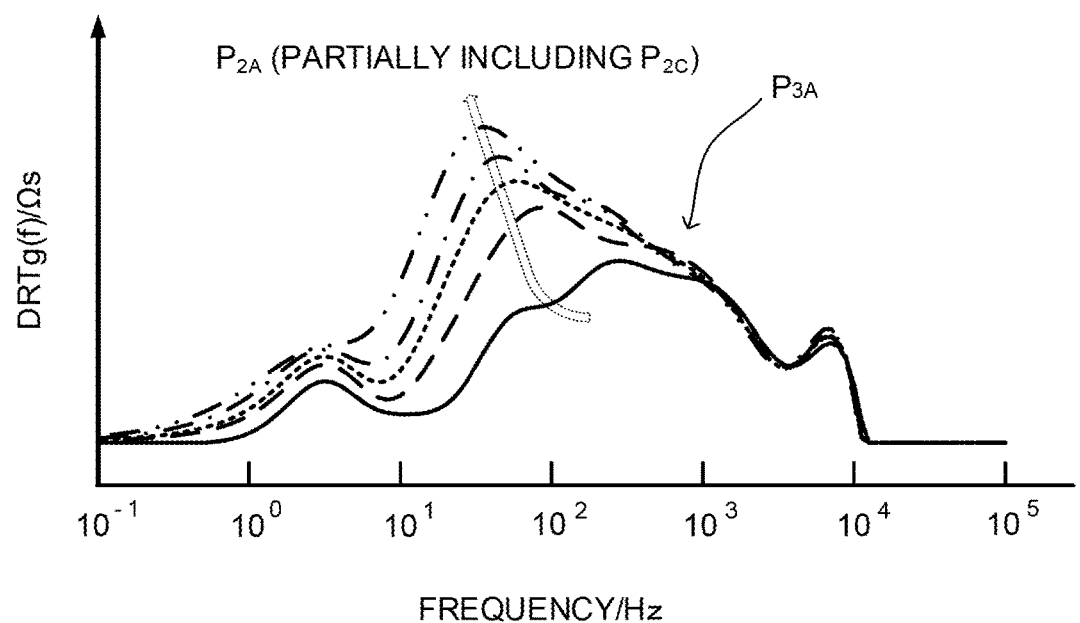
FIG. 5 illustrates one example of a DRT spectrum of a fuel cell stack.

FIG. 5 illustrates one example of the DRT spectrum of the fuel cell stack 10 having a general configuration. Note that the DRT spectrum illustrated in FIG. 5 is acquired by the following procedure.

(i) The stack temperature Ts is set to 750° C. and the fuel cell stack 10 is set to an open circuit state (OCV).

(ii) While the hydrogen concentration in the anode of the fuel cell stack 10 is being changed in balance with an inert gas (nitrogen gas), the internal impedance Z is measured within a measurement frequency range from 100 kHz to 0.1 Hz. That is, the content of the air or the like other than hydrogen and nitrogen in the anode is fixed. Note that the measurement of the internal impedance Z is performed at hydrogen concentrations of 65%, 30%, 20%, 15%, and 10%.

(iii) For each hydrogen concentration, a Cole-Cole plot is formed from internal impedances Z at a plurality of measurement frequencies (e.g., 120 or more measurement frequencies).

(iv) A distribution of relaxation times is calculated from data of the internal impedances Z obtained for each hydrogen concentration, and fitting is performed by the complex non-linear least squares method, so that the DRT spectrum illustrated in FIG. 5 is obtained.

In FIG. 5, a spectrum S1 of a hydrogen concentration of 65%, a spectrum S2 of a hydrogen concentration of 30%, a spectrum S3 of a hydrogen concentration of 20%, a spectrum S4 of a hydrogen concentration of 15%, and a spectrum S5 of a hydrogen concentration of 10% are respectively indicated by a continuous line, a broken line, a dotted line, an alternate long and short dash line, and an alternate long and two short dashes line. That is, the hydrogen concentration in the anode becomes lower in order of the spectra S1 to S5. Accordingly, as the hydrogen concentration in the anode becomes lower in order of the spectra S1 to S5, the ratio of oxygen to hydrogen gas in the anode increases, so that the reaction resistance of the anode increases. That is, it can be generally considered that the possibility of the occurrence of the catalyst oxidation in the anode becomes higher in order of the spectra S1 to S5 in FIG. 5.

In the DRT spectrum illustrated in FIG. 5, a low-frequency side anode reaction resistance peak $P_{2A}$ of the spectrum S1 appears around 100 Hz, and respective low-frequency side anode reaction resistance peaks $P_{2A}$ of the spectra S2 to S5 appear between 10 Hz to 100 Hz. In the meantime, respective high-frequency side anode reaction resistance peaks $P_{3A}$ of the spectra S1 to S5 all appear between 100 Hz to 1 kHz.

The DRT spectrum shows such a tendency that the low-frequency side anode reaction resistance peak $P_{2A}$ and the high-frequency side anode reaction resistance peak $P_{3A}$ become higher from the spectrum S1 to the spectrum S5, that is, as the catalyst oxidation in the anode progresses.

In the meantime, all the low-frequency side anode reaction resistance peaks $P_{2A}$ of the spectra S1 to S5 illustrated in FIG. 5 overlap with respective cathode reaction resistance peaks $P_{2C}$. Hereby, as described in the first embodiment, the low-frequency side anode reaction resistance peak $P_{2A}$ includes not only progress information of the catalyst oxidation in the anode, but also information of the cathode reaction resistance. Accordingly, in a case where the oxidative reaction in the cathode is inhibited due to insufficiency of the oxygen partial pressure in the cathode from a requested pressure, such a situation is assumed that, even if the catalyst oxidation in the anode does not proceed, the value of the internal impedance $Z(\omega_{P2A})$ at the frequency $\omega_{P2A}$ corresponding to the low-frequency side anode reaction resistance peak $P_{2A}$ increases.

In consideration of such a situation, the first embodiment deals with an example in which the execution determination of the EAP process is performed based on the internal impedance $Z(\omega_{P3A})$ at the frequency $\omega_{P3A}$ corresponding to the high-frequency side anode reaction resistance peak $P_{3A}$.

However, as illustrated in FIG. 5, while the influence of the cathode reaction resistance is more eliminated from the high-frequency side anode reaction resistance peak $P_{3A}$, the change amount of the high-frequency side anode reaction resistance peak $P_{3A}$ to the progress of the catalyst oxidation in the anode is smaller than that of the low-frequency side anode reaction resistance peak $P_{2A}$.

Accordingly, depending on a predetermined electrochemical characteristic in accordance with the operating state or the like of the fuel cell stack 10, it cannot be said that, even if the catalyst oxidation in the anode progresses, its influence does not necessarily clearly appear in the change of the internal impedance $Z(\omega_{P3A})$ based on the high-frequency side anode reaction resistance peak $P_{3A}$.

In view of such a situation, the inventors focused attention on that, in the scene where the catalyst oxidation in the anode might occur, e.g., at the time of operation stop or activation of the fuel cell stack 10, a decrease of the oxygen partial pressure in the cathode to such an extent that the height of the cathode reaction resistance peak $P_{2C}$ is largely changed is less likely to occur, and the inventors conceived that the EAP execution determination process is daringly performed by use of the internal impedance $Z(\omega_{P2A})$ based on the low-frequency side anode reaction resistance peak $P_{2A}$ closer to the cathode reaction resistance peak $P_{2C}$.

More specifically, based on the findings obtained from the conventional technique described in FIG. 24(b) on page 45, etc., in Non-Patent Literature 1, the height of the cathode reaction resistance peak $P_{2C}$ tends not to largely change within a range of the oxygen partial pressure in the cathode from 0.21 atm to 0.02 atm. Particularly, in a range from 0.21 atm to 0.05 atm, the height of the cathode reaction resistance peak $P_{2C}$ tends to be generally the same.

Meanwhile, in the scene where the catalyst oxidation in the anode might occur, e.g., at the time of operation stop or activation of the fuel cell stack 10 (in the scene where the EAP execution determination process should be performed), the counterflow of the gas into the anode from the anode discharged gas discharge passage 51 or the back diffusion of the air in the cathode to the anode occurs, as has been already described above.

That is, since the air in the cathode is rather rich, such a situation hardly occurs that the oxygen partial pressure decreases below 0.05 atm.

Accordingly, in the scene where the EAP execution determination process should be performed, the internal impedance $Z(\omega_{P2A})$ based on the low-frequency side anode reaction resistance peak $P_{2A}$ is not substantially affected by the cathode reaction resistance, and the internal impedance $Z(\omega_{P2A})$ changes only in accordance with the progress of the catalyst oxidation in the anode. Particularly, as is apparent from FIG. 5, the change amount of the low-frequency side anode reaction resistance peak $P_{2A}$ along with the progress of the catalyst oxidation in the anode is larger than the change amount of the high-frequency side anode reaction resistance peak $P_{3A}$. Accordingly, in the present embodiment, by using the internal impedance $Z(\omega_{P2A})$, it is possible to highly precisely detect the progress state of the catalyst oxidation in the anode in comparison with a case where the internal impedance $Z(\omega_{P3A})$ is used, thereby making it possible to further improve the accuracy of the EAP execution determination process.

Figure 6:
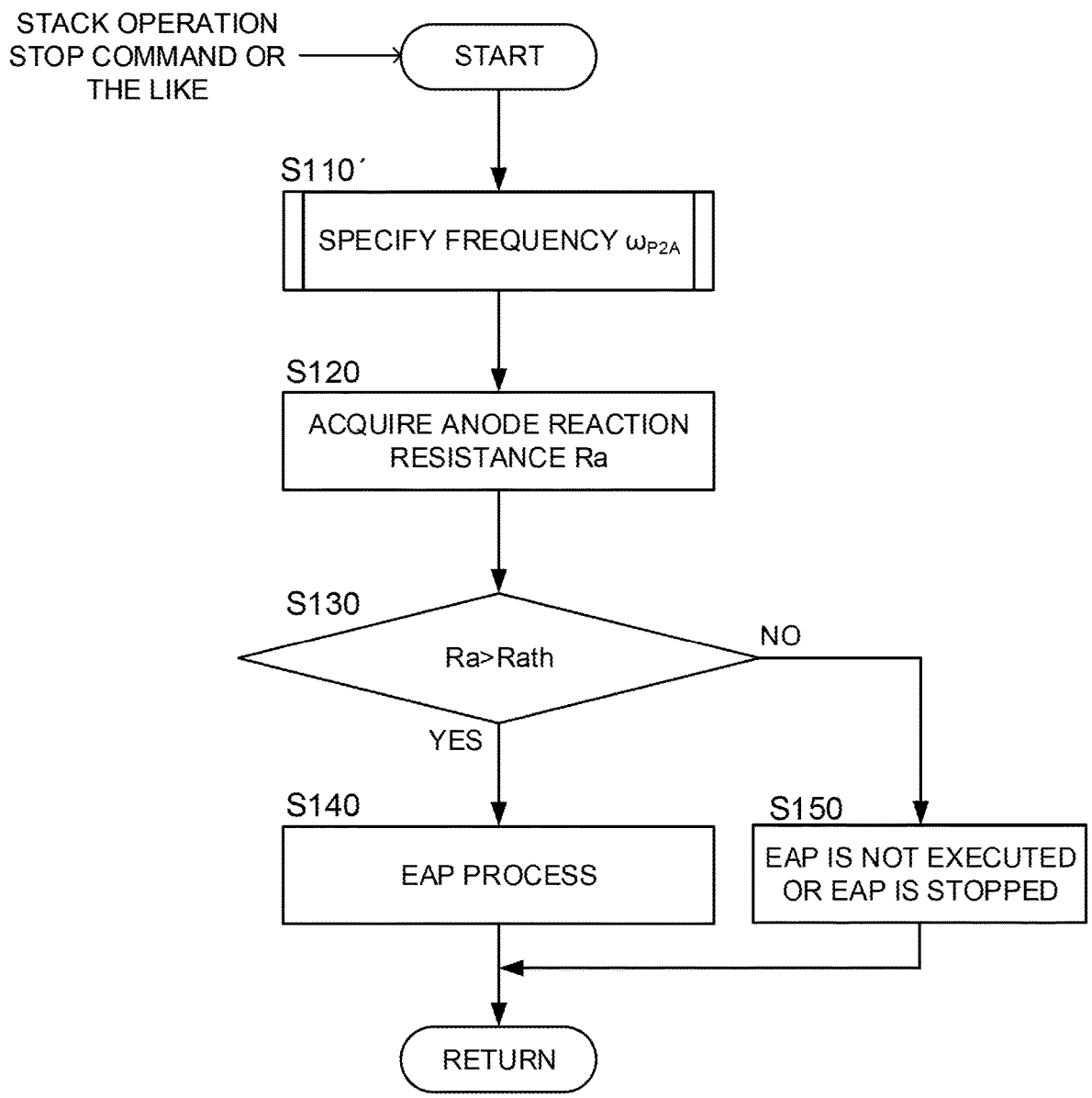
FIG. 6 is a flowchart illustrating the procedure of an EAP execution determination process according to one embodiment.
Figure 7:
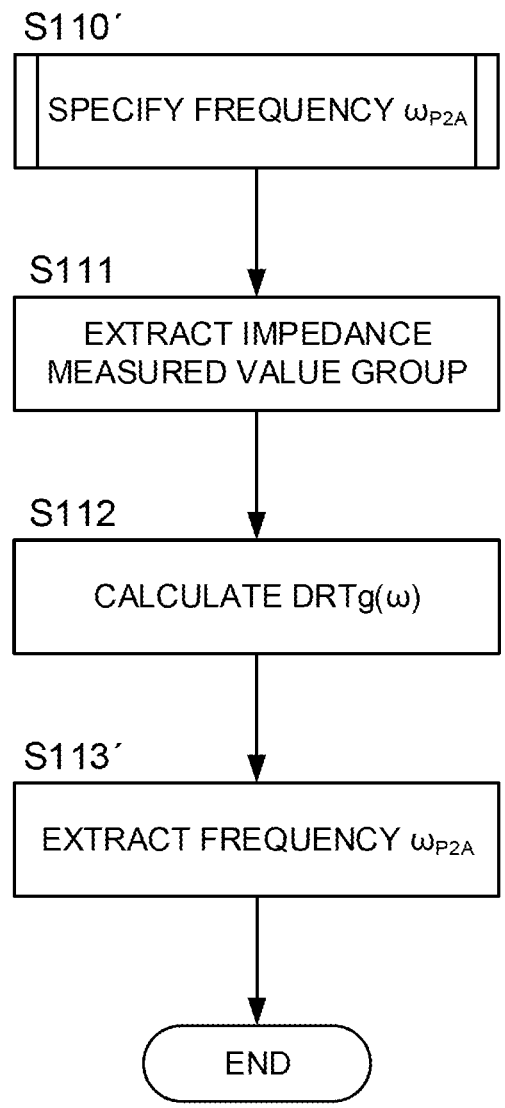
FIG. 7 is a flowchart to describe a specifying method of an anode response frequency according to one embodiment.

FIG. 6 is a flowchart illustrating the procedure of the EAP execution determination process in the present embodiment. Further, FIG. 7 is a flowchart illustrating the procedure to specify the frequency $\omega_{P2A}$ as an anode response frequency in the present embodiment. Note that, in the present embodiment, the EAP execution determination process is basically performed by the procedure similar to the procedure described in FIGS. 3 and 4 of the first embodiment, and therefore, the same step number is assigned to a step similar to the step in the first embodiment.

First, in step S110', the frequency $\omega_{P2A}$ corresponding to the low-frequency side anode reaction resistance peak $P_{2A}$ is specified by DRT analysis as the anode response frequency.

More specifically, as illustrated in FIG. 7, the extraction of the internal-impedance measured value group in step S111 and the calculation of DRTg(f) in step S112 are performed similarly to the first embodiment.

In the present embodiment, in step S113', the frequency $\omega_{P2A}$ is extracted from an obtained DRT spectrum in accordance with a frequency extraction program set in advance.

More specifically, the controller 80 first calculates a differential value of DRTg(f) in a frequency band from 10 Hz to 1 kHz in which the low-frequency side anode reaction resistance peak $P_{2A}$ is highly likely to appear. Then, the controller 80 then records frequencies $\omega_p$ at which the differential value of DRTg(f) is zero or not more than a predetermined value close to zero. Further, in a case where the number of recorded frequencies $\omega_P$ is just one, the controller 80 extracts this as the frequency $\omega_{P2A}$. In the meantime, in a case where a plurality of frequencies $\omega_P$ is recorded, the controller 80 extracts a smallest frequency $\omega_P$ as the frequency $\omega_{P2A}$ from among the frequencies $\omega_P$.

Note that, in the example illustrated in FIG. 5, the low-frequency side anode reaction resistance peak $P_{2A}$ shifts to the low-frequency side as the catalyst oxidation in the anode proceeds (indicated by a white dotted arrow in FIG. 5). Although an apparent reason why such a shift phenomenon of the low-frequency side anode reaction resistance peak $P_{2A}$ occurs is not clear, even when such a shift phenomenon occurs, the frequency $\omega_{P2A}$ corresponding to the low-frequency side anode reaction resistance peak $P_{2A}$ is generally 10 Hz or more.

Accordingly, as described above, when the smallest frequency among the frequencies $\omega_p$ at which the differential value of DRTg(f) in the frequency band from 10 Hz to 1 kHz is zero or not more than the predetermined value close to zero is extracted as the frequency $\omega_{P2A}$, it is possible to highly precisely specify the frequency $\omega_{P2A}$ of the low-frequency side anode reaction resistance peak $P_{2A}$ regardless of the progress state of the catalyst oxidation in the anode (even in any of the states of the spectra S1 to S5 in FIG. 5).

After the frequency $\omega_{P2A}$ corresponding to the low-frequency side anode reaction resistance peak $P_{2A}$ is specified, the processes after step S120 in FIG. 6 are executed in a similar manner to the first embodiment. Note that, for the reason that has been already described above, it can be considered that the value of the internal impedance $Z(\omega_{P2A})$ does not change substantially even if the cathode reaction resistance changes. In the meantime, since the value of a cathode reaction resistance in a steady state where the oxygen concentration in the cathode is not insufficient is included in the internal impedance $Z(\omega_{P2A})$, it is considered that the anode reaction resistance Ra calculated based on the internal impedance $Z(\omega_{P2A})$ is larger than a theoretical value by just that much. Accordingly, when the threshold Rath is set to be high just by the cathode reaction resistance in the steady state in consideration that the anode reaction resistance Ra includes the cathode reaction resistance in the steady state, it is possible to further improve the accuracy of the EAP execution determination process.

The control method for the fuel cell system 100 according to the present embodiment yields the following effects.

The internal impedance element of the present embodiment includes the cathode reaction resistance that is a cathode reaction resistance of the fuel cell stack 10.

The anode response frequency includes, in DRTg(f) as spectrum data indicative of the internal impedance $Z(\omega)$, the frequency $\omega_{P2A}$ corresponding to the low-frequency side anode reaction resistance peak $P_{2A}$ close to the cathode reaction resistance peak $P_{2C}$ that is a peak correlating with the cathode reaction resistance, out of the high-frequency side anode reaction resistance peak $P_{3A}$ and the low-frequency side anode reaction resistance peak $P_{2A}$ as two peaks correlating with the anode reaction resistance Ra.

With this configuration, in the scene where there is a concern about the catalyst oxidation in the anode in which the oxygen partial pressure in the cathode is considered not to greatly decrease, the EAP execution determination process can be performed based on the internal impedance $Z(\omega_{P2A})$ at the frequency $\omega_{P2A}$ from which the influence of the change of the cathode reaction resistance is substantially eliminated. Further, the low-frequency side anode reaction resistance peak $P_{2A}$ has a higher correlation (sensitivity) with the progress of the catalyst oxidation in the anode as compared with the high-frequency side anode reaction resistance peak $P_{3A}$.

Accordingly, by use of the internal impedance $Z(\omega_{P2A})$ in which the frequency $\omega_{P2A}$ corresponding to the low-frequency side anode reaction resistance peak $P_{2A}$ is taken as the anode response frequency, the EAP execution determination process can be performed more highly precisely.

Third Embodiment

The following describes a third embodiment. Note that a component similar to a component in the first embodiment or the second embodiment has the same reference sign as used in the first embodiment or the second embodiment, and a description thereof is omitted. Particularly, in the present embodiment, the determination on whether the EAP process is to be executed or not is performed based on a magnitude comparison of an increase magnification ΔRa (ΔRa={Ra/Ra0}) of a present anode reaction resistance Ra to a value (a predetermined reference value) of the anode reaction resistance Ra in a steady state, with a predetermined threshold ΔRath. Note that, in the following description, the value of the anode reaction resistance Ra in the steady state is also just referred to as "reference anode reaction resistance Ra0."

Note that the configuration of the present embodiment is also established for the EAP execution determination based on either of the internal impedances $Z(\omega_{P2A})$, $Z(\omega_{P2A})$ at the frequency $\omega_{P2A}$ corresponding to the low-frequency side anode reaction resistance peak $P_{2A}$ and the frequency $\omega_{P3A}$ corresponding to the high-frequency side anode reaction resistance peak $P_{3A}$ as the anode response frequencies.

Figure 8:
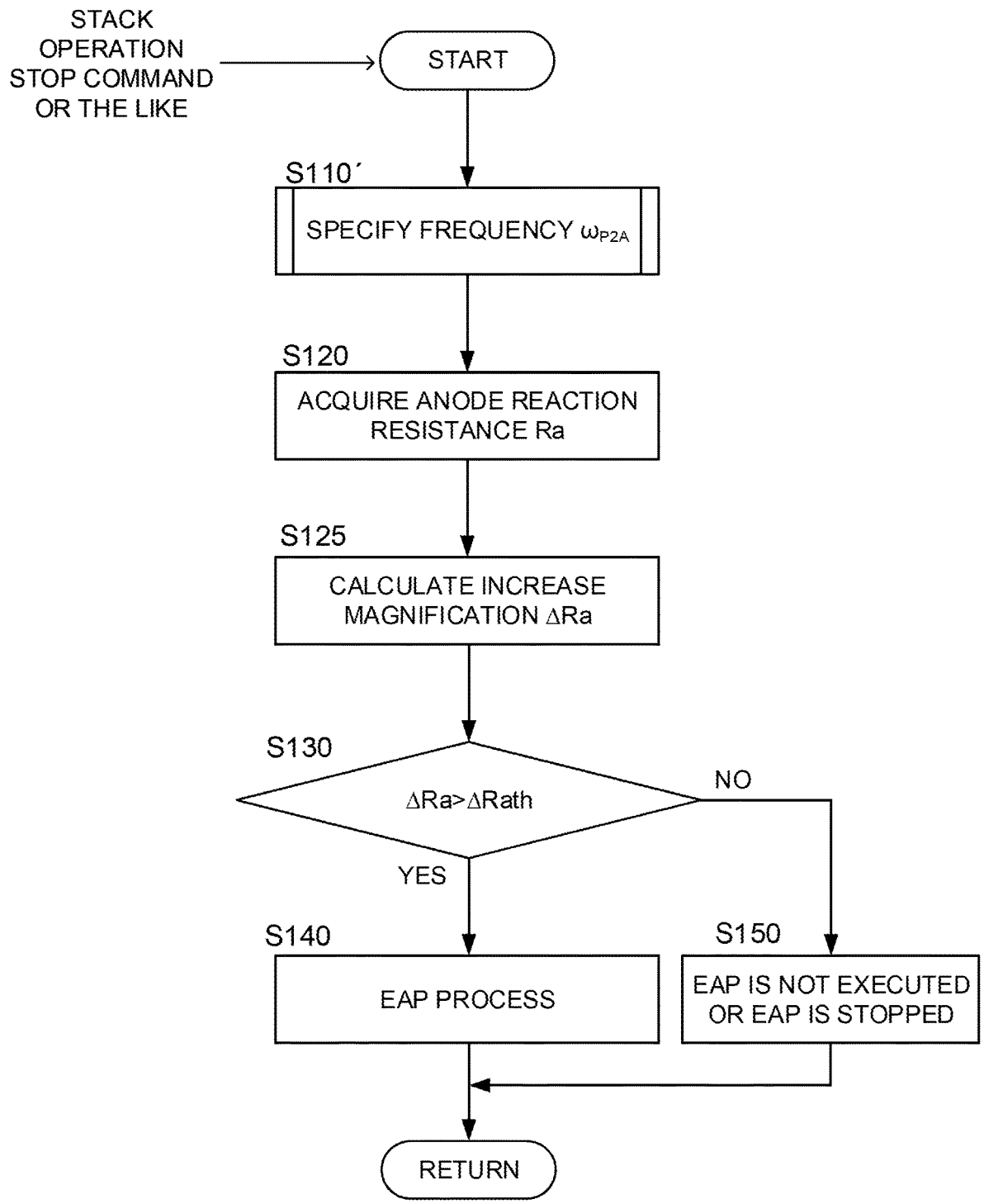
FIG. 8 is a flowchart illustrating the procedure of an EAP execution determination process according to one embodiment.

In view of this, from the viewpoint of simplification of the description, in FIG. 8 and the following description, the description is made only on the configuration on the basis of the EAP execution determination (the second embodiment) based on the internal impedance $Z(\omega_{P2A})$ at the frequency $\omega_{P2A}$. However, the present embodiment is not intended to eliminate the configuration of the EAP execution determination (the first embodiment) based on the internal impedance $Z(\omega_{P3A})$ at the frequency $\omega_{P3A}$.

FIG. 8 is a flowchart illustrating the procedure of the EAP execution determination process in the present embodiment. As illustrated herein, the processes of step S110' and step S120 are executed similarly to the second embodiment.

In step S125, the controller 80 calculates the increase magnification ΔRa. More specifically, the controller 80 reads the reference anode reaction resistance Ra0 stored in the memory or the like in advance and calculates the increase magnification ΔRa by dividing an anode reaction resistance Ra calculated in step S120 by the reference anode reaction resistance Ra0. That is, ΔRa=Ra/Ra0 is established.

Here, the reference anode reaction resistance Ra0 is the value of the anode reaction resistance Ra in the steady state of the fuel cell stack 10, for example, and is determined experimentally in advance in accordance with the specification or the like of the fuel cell stack 10.

Further, "the anode reaction resistance Ra in the steady state of the fuel cell stack 10" is an internal impedance in an open circuit state of the fuel cell stack 10 in a case where a reducing atmosphere is sufficiently maintained in the anode, no catalyst oxidation in the anode occurs, and the stack temperature Ts is an appropriate operating temperature (e.g., 700° C. to 900° C.) of the fuel cell stack 10.

In step S130, the controller 80 determines whether or not the increase magnification ΔRa found in step S125 exceeds the predetermined threshold ΔRath stored in the memory or the like in advance.

Here, the threshold ΔRath is determined from the viewpoint of whether or not the catalyst oxidation in the anode proceeds to such an extent that the execution of the EAP process is required, in comparison with the steady state of the fuel cell stack 10.

For example, the threshold ΔRath is determined to allow an increase magnification ΔRa as large as possible while a safety margin is secured to prevent the catalyst oxidation in the anode from reaching irreversible degradation, individually in accordance with the specification of the fuel cell stack 10 such as the number of laminated fuel cells or a component material, an individual difference, and so on.

When the controller 80 determines that the increase magnification ΔRa exceeds the threshold ΔRath, the process proceeds to step S140 in which the EAP process is executed. Meanwhile, when the controller 80 determines that the increase magnification ΔRa is the threshold ΔRath or less, the process proceeds to step S150 in which the EAP process is not executed or, when the EAP process has been already executed, the controller 80 stops the EAP process.

Note that, as described in the second embodiment, the anode reaction resistance Ra calculated based on the internal impedance $Z(\omega_{P2A})$ includes the value of the cathode reaction resistance in the steady state, and therefore, it is considered that the anode reaction resistance Ra is large in comparison with a theoretical value. However, the cathode reaction resistance in the steady state is small in comparison with the anode reaction resistance Ra. Further, for the reason described in the second embodiment, the cathode reaction resistance does not change substantially, so that the increase magnification ΔRa substantially depends only on the change of the anode reaction resistance Ra. Accordingly, even if the threshold ΔRath is set without considering the influence of the cathode reaction resistance in the steady state, it is possible to highly precisely maintain the accuracy of the EAP execution determination process.

The control method for the fuel cell system 100 according to the present embodiment yields the following effects.

In the control method for the fuel cell system 100 according to the present embodiment, in the anode protection execution determination process, the anode reaction resistance Ra is estimated based on the internal impedance $Z(\omega_{P2A})$ at the anode response frequency, and the increase magnification ΔRa of the anode reaction resistance Ra thus estimated to the reference anode reaction resistance Ra0 that is a predetermined reference value is calculated. When the increase magnification ΔRa is higher than the threshold ΔRath, it is determined that the EAP process is to be executed.

Hereby, the reference anode reaction resistance Ra0 in the steady state (in a state where the catalyst oxidation in the anode does not proceed) is set individually in accordance with the specification of the fuel cell stack 10 such as the number of laminated fuel cells or a component material, an individual difference, and so on, and the EAP process can be executed based on this. Accordingly, the execution determination of the EAP process can be performed in consideration of variations of the reference anode reaction resistance Ra0 in accordance with the specification of the fuel cell stack 10 such as the number of laminated fuel cells or a component material, an individual difference, and so on, so that the EAP process can be executed in a more appropriate timing.

FOURTH EMBODIMENT

The following describes a fourth embodiment. Note that a component similar to a component in the first to third embodiments has the same reference sign as used in the first to third embodiments, and a description thereof is omitted. Particularly, in the present embodiment, after it is determined that the EAP process is to be executed (step S130 in FIGS. 3 and 6), an applied voltage (an EAP current) in the EAP process at the time when the EAP process is executed in step S140 is adjusted based on the anode reaction resistance Ra.

Note that the present embodiment describes the EAP process after it is determined that the EAP process is to be executed in the EAP execution determination based on the internal impedance $Z(\omega_{P2A})$ at the frequency ($\omega_{P2A}$ in the second embodiment. However, the present embodiment is also applicable to the EAP process after it is determined that the EAP process is to be executed in the EAP execution determination based on the internal impedance $Z(\omega_{P3A})$ at the frequency $\omega_{P3A}$ in the first embodiment.

Figure 9:
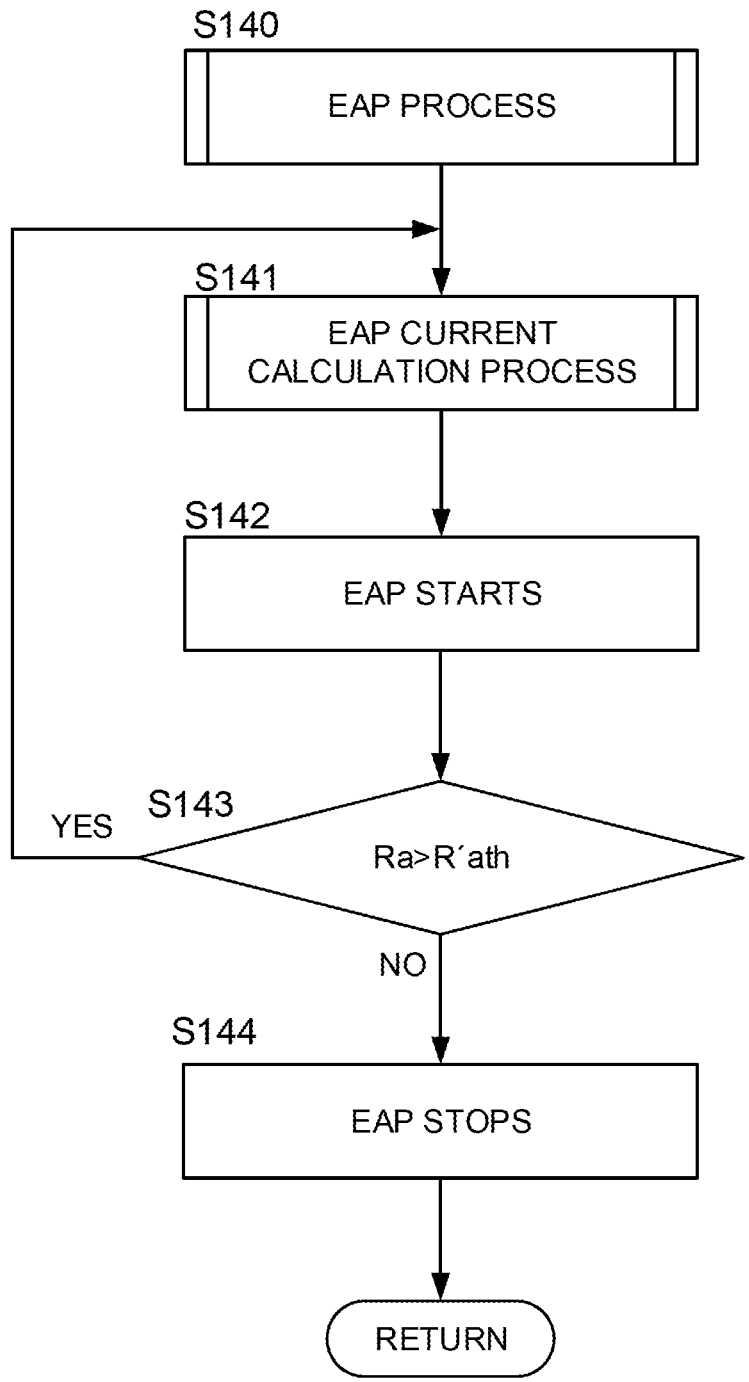
FIG. 9 is a flowchart illustrating the procedure of an EAP process according to one embodiment.

FIG. 9 is a flowchart illustrating the procedure of the EAP process of the present embodiment.

As illustrated herein, in the EAP process in step S140 of the present embodiment, the controller 80 calculates an EAP current in step S141. More specifically, the EAP current is determined based on a difference between the anode reaction resistance Ra calculated in step S120 in FIG. 6 and a predetermined threshold R'ath.

Here, the threshold R'ath can be determined as an appropriate EAP setting current from the viewpoint of maintaining the reducing atmosphere in the anode so that the catalyst oxidation in the anode does not proceed to such an extent that irreversible degradation of the catalyst occurs. That is, the threshold R'ath is determined appropriately as an index based on which it can be sufficiently determined that the reducing atmosphere is suitably maintained in the anode when the anode reaction resistance Ra does not exceed the threshold R'ath. The threshold R'ath is stored in the memory or the like of the controller 80.

Note that the threshold R'ath may be the same value as or a different value from the threshold Rath used in step S130 in FIG. 6 in the EAP process execution determination. Particularly, in a case where the threshold R'ath is the different value, when the threshold R'ath is set to be lower than the threshold Rath, the EAP current is set to be relatively high, so that the reducing atmosphere in the anode can be maintained more surely.

In step S142, the controller 80 starts the EAP process. More specifically, the controller 80 controls the DCDC converter 61 to adjust a supply current to the fuel cell stack 10 to the EAP current set in step S141 so that the EAP current is supplied to the fuel cell stack 10. Hereby, a reverse voltage corresponding to the set EAP current is applied to the fuel cell stack 10.

In step S143, the controller 80 determines whether or not the anode reaction resistance Ra exceeds the threshold R'ath. When the controller 80 determines that the anode reaction resistance Ra does not exceed the threshold R'ath, the process proceeds to step S144 in which the controller 80 stops the EAP process. In the meantime, when the controller 80 determines that the anode reaction resistance Ra exceeds the threshold R'ath, the controller 80 repeats the processes after step S141.

The control method for the fuel cell system 100 according to the present embodiment yields the following effects.

The fuel cell system 100 according to the present embodiment includes an EAP current calculation process (step S141 in FIG. 9) as a protection current adjustment process of adjusting a protection current to be applied to the fuel cell stack 10 when it is determined that the EAP process is to be executed in the EAP execution determination process (Yes in step S130 in FIG. 6).

In the EAP current calculation process, the magnitude of the protection current (the EAP current) is determined based on a difference between the anode reaction resistance Ra estimated based on the internal impedance $Z(\omega_{P2A})$ at the anode response frequency and the predetermined threshold R'ath.

Hereby, in the scene where the EAP process is executed, it is possible to achieve the function to restrain the oxidation degradation of the catalyst in accordance with the progress state of the catalyst oxidation in the anode and to appropriately set the EAP current from the viewpoint of restraining excessive power consumption.

Note that, in the present embodiment, as described above, the EAP current is set based on the difference between the anode reaction resistance Ra estimated based on the internal impedance $Z(\omega_{P2A})$ at the anode response frequency and the predetermined threshold R'ath. Meanwhile, instead of this, the EAP current may be set based on a difference between the increase magnification ΔRa and the predetermined threshold ΔR'ath as described in the third embodiment.

Fifth Embodiment

The following describes a fifth embodiment. Note that a component similar to a component in the first to fourth embodiments has the same reference sign as used in the first to fourth embodiments, and a description thereof is omitted. Particularly, the present embodiment describes an example in which the anode response frequency is corrected based on the stack temperature Ts.

Figure 10:
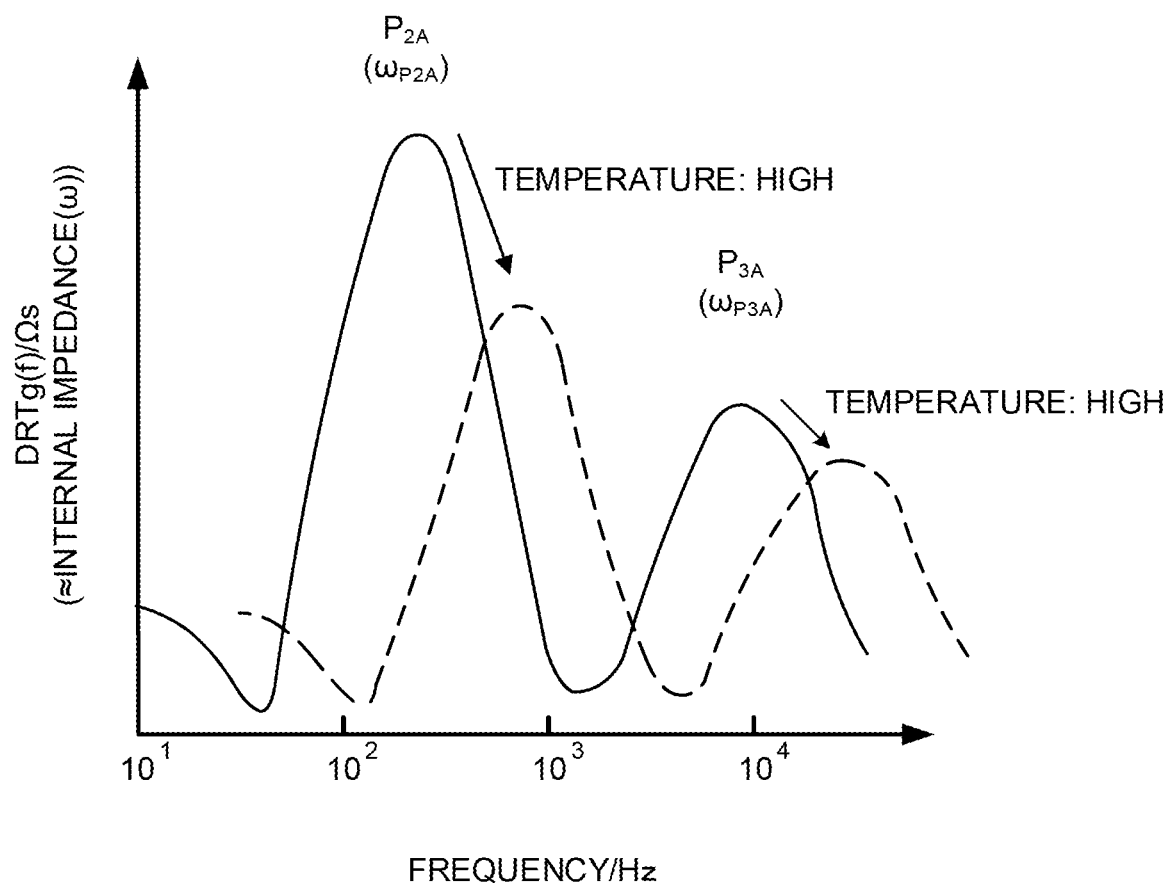
FIG. 10 is a view to describe temperature dependence at anode reaction resistance peak positions in a DRT spectrum of a fuel cell stack.

FIG. 10 is a view to describe temperature dependence at positions of the low-frequency side anode reaction resistance peak $P_{2A}$ and the high-frequency side anode reaction resistance peak $P_{3A}$ in the DRT spectrum of the fuel cell stack 10.

As illustrated herein, the positions of the low-frequency side anode reaction resistance peak $P_{2A}$ and the high-frequency side anode reaction resistance peak $P_{3A}$ shift to the high-frequency side as the stack temperature Ts becomes higher. That is, the frequency $\omega_{P2A}$ and the frequency $\omega_{P3A}$ respectively corresponding to the low-frequency side anode reaction resistance peak $P_{2A}$ and the high-frequency side anode reaction resistance peak $P_{3A}$ become larger as the stack temperature Ts becomes higher. In consideration of this phenomenon, in the present embodiment, the frequency of the internal impedance Z to be used for the EAP execution determination is corrected.

Note that, in the following description, for simplification of the description, the frequency $\omega_{P2A}$ and the frequency $\omega_{P3A}$ are collectively referred to as a frequency $\omega_{P4}$.

In the present embodiment, at the time of specifying a frequency in step S110 in FIG. 4 and step S110' in FIG. 7, a correction frequency $\omega'_{P4}$ corrected in consideration of the stack temperature Ts is extracted. A detailed description thereof is given below.

Figure 11:
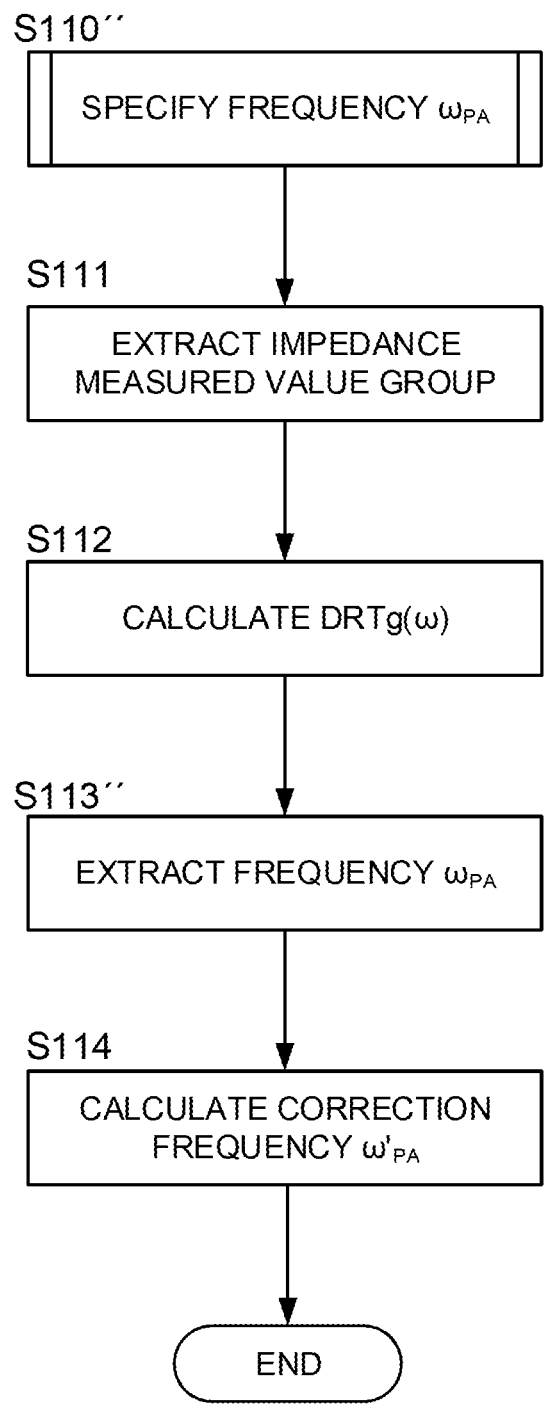
FIG. 11 is a flowchart illustrating the procedure to specify an anode response frequency according to one embodiment.

FIG. 11 is a flowchart illustrating the procedure of a process of specifying a frequency to acquire the internal impedance Z in the present embodiment.

As illustrated herein, in the present embodiment, DRTg(f) is found through step S111 and step S112 similarly to the first embodiment.

In step S113", the controller 80 extracts the frequency $\omega_{PA}$ from an obtained DRT spectrum in a similar manner to the first embodiment or the second embodiment.

In step S114, the controller 80 calculates the correction frequency $\omega'_{PA}$ by multiplying the extracted frequency $\omega_{PA}$ by a correction coefficient K(Tst) corresponding to the stack temperature Ts. The correction coefficient K(Tst) is determined to become a higher value as the stack temperature Ts increases.

Note that the correction coefficient K(Tst) can be calculated from a detection value of the stack temperature Ts based on a map determined by experiment or the like in advance, the map indicating a relationship between the stack temperature Ts and a shift amount (a value of a frequency to shift) of the low-frequency side anode reaction resistance peak $P_{2A}$ or the high-frequency side anode reaction resistance peak $P_{3A}$.

The controller 80 executes the processes after step S120 as described in FIG. 3, FIG. 6, or FIG. 8, based on the obtained correction frequency $\omega'_{PA}$. That is, the controller 80 performs the execution determination of the EAP process based on an internal impedance $Z(\omega'_{PA})$.

The control method for the fuel cell system 100 according to the present embodiment yields the following effects.

In the present embodiment, in the EAP execution determination process, it is determined whether the EAP process is to be executed or not, in consideration of the stack temperature Ts in addition to the internal impedance $Z(\omega_{PA})$ of the anode response frequency. Particularly, in the present embodiment, it is determined whether the EAP process is to be executed or not, based on the internal impedance $Z(\omega'_{PA})$ at the correction frequency $\omega_{PA}$ corrected in accordance with the change of the stack temperature Ts.

Hereby, in a case where the low-frequency side anode reaction resistance peak $P_{2A}$ and the high-frequency side anode reaction resistance peak $P_{3A}$ shift in accordance with the change of the stack temperature Ts, the execution determination of the EAP process is performed based on the internal impedance $Z(\omega'_{PA})$ of the correction frequency $\omega'_{PA}$ adjusted along with the shift, thereby making it possible to further improve the accuracy of the execution determination.

Note that, as understood with reference to FIG. 10, when the stack temperature Ts changes, not only the low-frequency side anode reaction resistance peak $P_{2A}$ and the high-frequency side anode reaction resistance peak $P_{3A}$ shift, but also their heights change. Particularly, as the stack temperature Ts becomes higher, the height of the peak tends to become lower. Accordingly, the threshold Rath or the threshold ΔRath to be compared with the anode reaction resistance Ra or the increase magnification ΔRa may be changed in accordance with the change of the stack temperature Ts. More specifically, the threshold Rath or the threshold ΔRath may be set to be lower as the stack temperature Ts becomes higher.

Further, in the EAP execution determination process of the present embodiment, when the stack temperature Ts becomes lower than the oxidative degradation point, the controller 80 may stop the EAP process regardless of the value of the internal impedance Z, in consideration that the oxidative reaction in the anode catalyst does not occur theoretically.

The embodiments of the present invention have been described above, but the embodiments just exemplify some applications of the present invention and are not intended to limit the technical scope of the present invention to the concrete configurations of the embodiments.

For example, the process of specifying the frequency $\omega_{P2A}$ or the frequency $\omega_{P3A}$ for the internal impedance Z to be used for the EAP execution determination (see FIG. 4, FIG. 7 or the like) may be performed in advance, and the specified frequency $\omega_{P2A}$ or frequency $\omega_{P3A}$ may be stored in the memory or the like of the controller 80. Hereby, it is possible to perform the execution determination of the EAP process without performing DRT analysis in the EAP execution determination process.

Further, the anode reaction resistance Ra in step S120 in FIG. 3 may be found from the internal impedance Z in various other methods except the method of finding the absolute value of the internal impedance Z.

For example, in the above embodiments, the EAP execution determination process is executed by use of the internal impedance $Z(\omega)$ of the fuel cell stack 10, but the EAP execution determination process may be executed by use of an internal impedance of one fuel cell constituting the fuel cell stack 10 or a representative value, an average value, or the like of internal impedances of a plurality of fuel cells.

Further, in the specification of the frequency $\omega_{P2A}$ or the frequency $\omega_{P3A}$ as illustrated in FIG. 4 and so on in the embodiments, the predetermined frequency band in which the internal-impedance measured value group is acquired may be changed appropriately in accordance with frequencies that are considered to include the target frequency $\omega_{P2A}$ corresponding to the low-frequency side anode reaction resistance peak $P_{2A}$ and the frequency $\omega_{P3A}$ corresponding to the high-frequency side anode reaction resistance peak $P_{3A}$. For example, in a case where it is considered that those peaks are less likely to exist in an extremely low frequency band between 0.1 Hz to 10 Hz or in a high frequency band of 10 kHz or more, the frequency band to acquire the internal-impedance measured value group may be set to 10 Hz to 1 kHz.

This makes it unnecessary to consider the internal impedance in the extremely low frequency band that takes much time for measurement, so that it is possible to shorten an operation period for the controller 80 to perform the EAP execution determination process illustrated in FIG. 3 and the like, thereby resulting in that the accuracy of the EAP execution determination further improves. Further, it is not necessary to consider the internal impedance in the high frequency band including the influence of the internal impedance element such as a contact resistance except the anode reaction resistance, so that it is possible to easily specify the frequency $\omega_{P2A}$ or the frequency $\omega_{P3A}$.

Further, the above embodiments mainly deal with an example in which the EAP execution determination process illustrated in FIG. 3 or the like is executed at the time of operation stop of the fuel cell stack 10. However, for example, the EAP execution determination process may be executed in a given scene where the catalyst oxidation in the anode easily proceeds, e.g., at the time of activation (operation start) of the fuel cell stack 10 or a low load operation to such an extent that the application of a reverse current for the EAP process is not inhibited.

For example, in a case where, though the fuel cell system 100 is in an operating state (an EV key is turned on), substantially no power is supplied from the fuel cell stack 10 to the battery 62 and the drive motor 63 or the power is lower than power requested from the battery 62 and the drive motor 63 (in a case of an idle stop state), such a situation is considered that, though the stack temperature Ts is higher than the oxidative degradation point, back diffusion or counterflow easily occurs due to a decrease of the supply amount of the fuel gas to the fuel cell stack 10, so that the oxidative atmosphere is generated in the anode.

Further, in an activation process sequence, of the fuel cell stack 10, that is executed upon receipt of an EV-key OFF signal (an activation command of the fuel cell stack 10) as a trigger, in a case where the fuel cell stack 10 is heated by the activation combustion mechanism 30 or the like so that the stack temperature Ts immediately reaches an operating temperature, such a situation is assumed that, though the stack temperature Ts exceeds the oxidative degradation point, the temperature of the reformer 28 is not sufficiently high, so that the oxidative atmosphere is generated in the anode due to insufficiency of the supply amount of the fuel gas to the anode.

Accordingly, when the EAP execution determination process of the embodiments is executed in the scene where the anode relatively easily has the oxidative atmosphere, e.g., at the time of idle stop or activation, it is possible to restrain an increase of power consumption due to unnecessary execution of the EAP process and to appropriately execute the EAP process.

Further, the above embodiments deal with an example in which the EAP execution determination process is executed based on the internal impedance Z of one of the frequency $\omega_{P2A}$ corresponding to the low-frequency side anode reaction resistance peak $P_{2A}$ and the frequency $\omega_{P3A}$ corresponding to the high-frequency side anode reaction resistance peak $P_{3A}$. However, the EAP execution determination process may be executed based on both of the internal impedance $Z(\omega_{P2A})$ at the frequency $\omega_{P2A}$ and the internal impedance $Z(\omega_{P3A})$ at the frequency $\omega_{P3A}$.

More specifically, for example, when an anode reaction resistance $Ra(\omega_{P2A})$ calculated from the internal impedance $Z(\omega_{P2A})$ exceeds a threshold $Rath(\omega_{P2A})$ and an anode reaction resistance $Ra(\omega_{P3A})$ calculated from the internal impedance $Z(\omega_{P3A})$ exceeds a threshold $Rath(\omega_{P3A})$, the EAP process may be executed, and if not, the EAP process may not be executed or may be stopped. Hereby, even in a case where the value of one of the internal impedance $Z(\omega_{P2A})$ and the internal impedance $Z(\omega_{P3A})$ changes due to a factor such as an error of a measurement system or the like except the catalyst oxidation in the anode, for example, the value of the other one is also referred to in the EAP execution determination, thereby making it possible to further improve the accuracy of the EAP execution determination.

Further, in this case, the threshold $Rath(\omega_{P2A})$ and the threshold $Rath(\omega_{P3A})$ may be set to the same value or may be set to values different from each other. For example, as described in the second embodiment, the high-frequency side anode reaction resistance peak $P_{3A}$ is highly sensitive to the progress of the catalyst oxidation in the anode as compared with the low-frequency side anode reaction resistance peak $P_{2A}$, and therefore, in consideration of this, the threshold $Rath(\omega_{P3A})$ may be set to be small in comparison with the threshold $Rath(\omega_{P2A})$.

Further, when an increase magnification $\Delta Ra(\omega_{P2A})$ of an anode reaction resistance $Ra(\omega_{P2A})$ calculated from the internal impedance $Z(\omega_{P2A})$ exceeds a threshold $\Delta Rath (\omega_{P2A})$ and when an increase magnification $\Delta Ra(\omega_{P3A})$ of an anode reaction resistance $Ra(\omega_{P3A})$ calculated from the internal impedance $Z(\omega_{P3A})$ exceeds a threshold $\Delta Rath (\omega_{P3A})$, the EAP process may be executed, and if not, the EAP process may not be executed or may be stopped.

Further, the above embodiments mainly deal with an example in which predetermined values are used as the threshold Rath, the threshold $\Delta Rath$, and the reference anode reaction resistance Ra0. However, these values may be adjusted appropriately based on a predetermined learning control or the like in an operation course of the fuel cell system 100 and the fuel cell stack 10.

Further, the above embodiments can be combined in a given manner.

The invention claimed is:

1. A control method for a fuel cell system including a solid oxide fuel cell configured to generate power upon receipt of supply of an anode gas and a cathode gas, the control method comprising:
   executing an anode protection process comprising applying, by a controller, a predetermined protection current to the fuel cell in order to restrain catalyst oxidation in an anode of the fuel cell;
   executing an anode protection execution determination process including acquiring, by the controller, an internal impedance of the fuel cell at an anode response frequency at which an anode reaction resistance of the fuel cell is detectable; and
   based on the internal impedance at the anode response frequency, determining, by the controller, whether the anode protection process is to be executed or not, wherein:
   the anode response frequency is a frequency at which a change amount of the internal impedance due to a change of the anode reaction resistance becomes larger than a change amount of the internal impedance due to a change of an internal impedance element except the anode reaction resistance;
   the internal impedance element includes a cathode reaction resistance of the fuel cell;
   the anode response frequency includes a frequency corresponding to at least one of two peaks correlating with the anode reaction resistance in spectrum data indicative of the internal impedance; and
   the anode response frequency includes a frequency corresponding to a peak on a low-frequency side close to a peak correlating with the cathode reaction resistance of the two peaks correlating with the anode reaction resistance.

2. A control method for a fuel cell system including a solid oxide fuel cell configured to generate power upon receipt of supply of an anode gas and a cathode gas, the control method comprising:
   executing an anode protection process comprising applying, by a controller, a predetermined protection current to the fuel cell in order to restrain catalyst oxidation in an anode of the fuel cell;
   executing an anode protection execution determination process including acquiring, by the controller, an internal impedance of the fuel cell at an anode response frequency at which an anode reaction resistance of the fuel cell is detectable;
   based on the internal impedance at the anode response frequency, determining, by the controller, whether the anode protection process is to be executed or not,
   wherein the anode protection execution determination process further comprises:
   estimating, by the controller, the anode reaction resistance based on the internal impedance at the anode response frequency, and
   when the anode reaction resistance thus estimated is higher than a predetermined threshold, determining, by the controller, that the anode protection process is to be executed; and executing, by the controller, a protection current adjustment process including adjusting, by the controller, the protection current when it is determined that the anode protection process is to be executed, wherein a magnitude of the protection current is determined based on a difference between the anode reaction resistance estimated based on the internal impedance at the anode response frequency or an increase magnification of the estimated anode reaction resistance to a predetermined reference value and the predetermined threshold.

3. A control method for a fuel cell system including a solid oxide fuel cell configured to generate power upon receipt of supply of an anode gas and a cathode gas, the control method comprising:

executing an anode protection process comprising applying, by a controller, a predetermined protection current to the fuel cell in order to restrain catalyst oxidation in an anode of the fuel cell;

executing an anode protection execution determination process including acquiring, by the controller, an internal impedance of the fuel cell at an anode response frequency at which an anode reaction resistance of the fuel cell is detectable;

based on the internal impedance at the anode response frequency, determining, by the controller, whether the anode protection process is to be executed or not;

wherein the anode protection execution determination process further comprises:

estimating, by the controller, the anode reaction resistance based on the internal impedance at the anode response frequency, calculating, by the controller, an increase magnification of the estimated anode reaction resistance to a predetermined reference value, and when the increase magnification is higher than a predetermined threshold, determining, by the controller, that the anode protection process is to be executed; and executing, by the controller, a protection current adjustment process including adjusting, by the controller, the protection current when it is determined that the anode protection process is to be executed, wherein a magnitude of the protection current is determined based on a difference between the anode reaction resistance estimated based on the internal impedance at the anode response frequency or an increase magnification of the estimated anode reaction resistance to the predetermined reference value and the predetermined threshold.

* * * * *